United States Patent
Sugano et al.

(10) Patent No.: US 10,457,755 B2
(45) Date of Patent: Oct. 29, 2019

(54) SOLID CATALYST COMPONENT FOR OLEFIN POLYMERIZATION, METHOD FOR PRODUCING THE SAME, OLEFIN POLYMERIZATION CATALYST, AND METHOD FOR PRODUCING OLEFIN POLYMER

(71) Applicant: TOHO TITANIUM CO., LTD., Chigasaki-shi (JP)

(72) Inventors: Toshihiko Sugano, Chigasaki (JP); Toshiya Uozumi, Chigasaki (JP); Motoki Hosaka, Chigasaki (JP)

(73) Assignee: TOHO TITANIUM CO., LTD., Chigasaki-shi (JP)

( * ) Notice: Subject to any disclaimer, the term of this patent is extended or adjusted under 35 U.S.C. 154(b) by 193 days.

(21) Appl. No.: 15/109,611

(22) PCT Filed: Aug. 4, 2014

(86) PCT No.: PCT/JP2014/070450
§ 371 (c)(1),
(2) Date: Jul. 1, 2016

(87) PCT Pub. No.: WO2015/107708
PCT Pub. Date: Jul. 23, 2015

(65) Prior Publication Data
US 2016/0326277 A1    Nov. 10, 2016

(30) Foreign Application Priority Data

Jan. 20, 2014  (JP) ................................ 2014-007722

(51) Int. Cl.
*C08F 4/649*    (2006.01)
*C08F 297/08*   (2006.01)
*C08F 110/06*   (2006.01)

(52) U.S. Cl.
CPC .......... *C08F 4/6494* (2013.01); *C08F 110/06* (2013.01); *C08F 297/08* (2013.01); *C08F 297/083* (2013.01)

(58) Field of Classification Search
CPC .................................................... C08F 4/6494
See application file for complete search history.

(56) References Cited

U.S. PATENT DOCUMENTS

| | | | |
|---|---|---|---|
| 5,618,886 A | 4/1997 | Shinozaki et al. | |
| 5,723,400 A | 3/1998 | Morini et al. | |

(Continued)

FOREIGN PATENT DOCUMENTS

| | | | | |
|---|---|---|---|---|
| EP | 0361493 A1 * | 4/1990 | ............ | C07C 43/10 |
| JP | 6-228223 A | 8/1994 | | |

(Continued)

OTHER PUBLICATIONS

International Search Report dated Oct. 14, 2014 in PCT/JP2014/070450 filed Aug. 4, 2014.

*Primary Examiner* — Catherine S Branch
(74) *Attorney, Agent, or Firm* — Oblon, McClelland, Maier & Neustadt, L.L.P.

(57) ABSTRACT

High stereoregularity, highly active catalytic performance, and good hydrogen response can be obtained by homopolymerizing propylene in the presence of a catalyst that includes a solid catalyst component including titanium, magnesium, a halogen, a carbonate compound represented by the following formula, and a diether compound. Excellent polymerization behavior can also be obtained when effecting random copolymerization or block copolymerization.

$$R^1-O-C(=O)-O-Z-O-R^2 \qquad (1)$$

wherein $R^1$ and $R^2$ are a hydrocarbon group or a substituted hydrocarbon group having 1 to 24 carbon atoms, or a heteroatom-containing group, provided that $R^1$ and $R^2$ are either identical or different, and Z is a linking group that links two oxygen atoms through a carbon atom or a carbon chain.

14 Claims, 1 Drawing Sheet

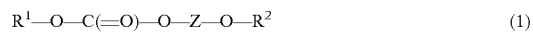

(56) References Cited

U.S. PATENT DOCUMENTS

| | | | |
|---|---|---|---|
| 6,323,150 B1 | 11/2001 | Kojoh et al. | |
| 2012/0242003 A1* | 9/2012 | Forgue et al. | C08F 110/06 |
| | | | 264/322 |
| 2014/0343237 A1* | 11/2014 | Sugano et al. | C08F 4/16 |
| | | | 526/123.1 |

FOREIGN PATENT DOCUMENTS

| | | | |
|---|---|---|---|
| JP | 7-102029 A | 4/1995 | |
| JP | 8-3215 A | 1/1996 | |
| JP | 8-67710 A | 3/1996 | |
| JP | 9-20804 A | 1/1997 | |
| JP | 9-87329 A | 3/1997 | |
| JP | 11-116615 A | 4/1999 | |
| JP | 2004-315742 A | 11/2004 | |
| JP | 2005-48045 A | 2/2005 | |
| JP | 2012-214556 A | 11/2012 | |
| JP | 2014-162906 A | 9/2014 | |
| WO | 2013/042400 A1 | 3/2013 | |
| WO | 2014/132759 A1 | 9/2014 | |

* cited by examiner (A) SOLID CATALYST COMPONENT FOR OLEFIN POLYMERIZATION
- MAGNESIUM COMPOUND
- TITANIUM COMPOUND
- COMPOUND REPRESENTED BY FORMULA (1): $R^1\text{-O-C(=O)-O-Z-O-}R^2$ AND DIETHER COMPOUND (B) ORGANOALUMINUM COMPONENT (C) EXTERNAL ELECTRON DONOR COMPOUND

OLEFIN POLYMERIZATION CATALYST

SOLID CATALYST COMPONENT FOR OLEFIN POLYMERIZATION, METHOD FOR PRODUCING THE SAME, OLEFIN POLYMERIZATION CATALYST, AND METHOD FOR PRODUCING OLEFIN POLYMER

TECHNICAL FIELD

The invention relates to a solid catalyst component for olefin polymerization that includes an electron donor compound that can be used as a substitute for a phthalic ester, a method for producing the same, an olefin polymerization catalyst, and a method for producing an olefin polymer.

BACKGROUND ART

A solid catalyst component that includes magnesium, titanium, an electron donor compound (e.g., phthalic ester), and a halogen atom as essential components has been known as a component of an olefin polymerization catalyst. Various olefin polymerization catalysts have been proposed that include the solid catalyst component, an organoaluminum compound, and an organosilicon compound.

Various compounds that include an electron-donating group (e.g., diether compound and carbonate ether compound) have been proposed as a substitute for the phthalic ester. A diether compound produces a highly active catalyst that provides moderately high stereoregularity, and ensures good copolymerizability and good hydrogen response. However, the resulting polymer has a narrow molecular weight distribution, and a low block ratio is obtained when implementing ICP polymerization. A carbonate ether compound provides high stereoregularity, and ensures a high block ratio when implementing ICP polymerization. However, the activity, the copolymerizability, and the hydrogen response achieved using a carbonate ether compound are poor as compared with those achieved using a diether compound.

RELATED-ART DOCUMENT

Patent Document

Patent Document 1: JP-A-2012-214556
Patent Document 2: JP-A-8-67710
Patent Document 3: JP-A-8-3215
Patent Document 4: JP-A-2004-315742
Patent Document 5: JP-A-2005-48045
Patent Document 6: JP-A-6-228223
Patent Document 7: JP-A-9-87329

SUMMARY OF THE INVENTION

Technical Problem

Although known catalysts have improved performance, a catalyst has not been proposed that ensures high stereoregularity, exhibits highly active catalytic performance, ensures good hydrogen response, and provides a moderate molecular weight distribution that ensures excellent moldability (formability) when used for propylene homopolymerization, and ensures excellent polymerization behavior when used for random copolymerization or block copolymerization. Therefore, development of technology that further improves the performance of a catalyst has been strongly desired.

An object of the invention is to provide a high-performance solid catalyst component and a high-performance catalyst that ensure high polymerization activity, high stereoregularity, and good hydrogen response when used for propylene homopolymerization, and ensures excellent polymerization behavior when used for random copolymerization or block copolymerization. Another object of the invention is to provide a high-performance solid catalyst component and a high-performance catalyst that makes it possible to produce a propylene-based block copolymer (e.g., ethylene-propylene rubber) that has a high rubber content, and exhibits excellent rigidity and high impact resistance in a well-balanced manner.

Solution to Problem

The inventors of the invention conducted extensive studies in view of the above situation. As a result, the inventors found that the above objects can be achieved by a solid catalyst component that includes magnesium, titanium, a halogen, a compound that includes an ether group and a carbonate group, and an ether compound that includes two or more ether groups, and a catalyst that includes the solid catalyst component. This finding has led to the completion of the invention.

According to one aspect of the invention, a solid catalyst component for olefin polymerization includes magnesium, titanium, a halogen, a carbonate compound (A) represented by the following general formula (1), and an ether compound (B) that includes two or more ether groups, $$R^1-O-C(=O)-O-Z-O-R^2 \quad (1)$$

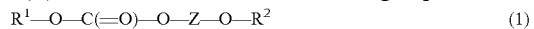

wherein $R^1$ and $R^2$ are a hydrocarbon group or a substituted hydrocarbon group having 1 to 24 carbon atoms, or a heteroatom-containing group, provided that $R^1$ and $R^2$ are either identical or different, and Z is a linking group that links two oxygen atoms through a carbon atom or a carbon chain.

According to another aspect of the invention, a method for producing a solid catalyst component for olefin polymerization includes bringing a magnesium compound, a halogen-containing titanium compound, a carbonate compound (A) represented by the following general formula (1), and an ether compound (B) that includes two or more ether groups, into contact with each other, $$R^1-O-C(=O)-O-Z-O-R^2 \quad (1)$$

wherein $R^1$ and $R^2$ are a hydrocarbon group or a substituted hydrocarbon group having 1 to 24 carbon atoms, or a heteroatom-containing group, provided that $R^1$ and $R^2$ are either identical or different, and Z is a linking group that links two oxygen atoms through a carbon atom or a carbon chain.

According to another aspect of the invention, an olefin polymerization catalyst includes the solid catalyst component for olefin polymerization, and an organoaluminum compound represented by the following general formula (4), $$R^{11}_p AlQ_{3-p} \quad (4)$$

wherein $R^{11}$ is an alkyl group having 1 to 6 carbon atoms, Q is a hydrogen atom or a halogen atom, and p is a real number that satisfies $0 < p \leq 3$, provided that a plurality of $R^{11}$ are either identical or different when a plurality of $R^{11}$ are present.

According to another aspect of the invention, a method for producing an olefin polymer includes polymerizing an olefin in the presence of the olefin polymerization catalyst.

Advantageous Effects of the Invention

The solid catalyst component and the catalyst according to the aspects of the invention make it possible to produce homopolypropylene that exhibits high activity and high stereoregularity, and a propylene-based random copolymer that includes a small amount of ethylene. When propylene is homopolymerized in the first step, and ethylene and propylene are copolymerized in the second step, it is possible to obtain a propylene-based block copolymer that exhibits high rigidity and high impact resistance in high yield while achieving high copolymerization activity.

BRIEF DESCRIPTION OF DRAWING

FIG. 1 is a flowchart illustrating a process for producing a polymerization catalyst according to one embodiment of the invention.

DESCRIPTION OF EMBODIMENTS

Solid Catalyst Component

A solid catalyst component for olefin polymerization (hereinafter may be referred to as "component (I)" or "solid catalyst component (I)") according to one embodiment of the invention includes magnesium, titanium, a halogen, the carbonate compound (A) represented by the general formula (1) (hereinafter may be referred to as "component (A)"), and the ether compound (B) that includes two or more ether groups (hereinafter may be referred to as "component (B)"), as essential components.

Examples of the halogen include a fluorine atom, a chlorine atom, a bromine atom, and an iodine atom. Among these, a chlorine atom, a bromine atom, and an iodine atom are preferable, and a chlorine atom and an iodine atom are particularly preferable.

Examples of the hydrocarbon group or the substituted hydrocarbon group having 1 to 24 carbon atoms represented by $R^1$ and $R^2$ in the general formula (1) include linear alkyl groups having 1 to 24 carbon atoms, branched alkyl groups having 3 to 20 carbon atoms, a vinyl group, linear or branched alkenyl groups having 3 to 20 carbon atoms, linear halogen-substituted alkyl groups having 1 to 20 carbon atoms, branched halogen-substituted alkyl groups having 3 to 20 carbon atoms, linear halogen-substituted alkenyl groups having 2 to 20 carbon atoms, branched halogen-substituted alkenyl groups having 3 to 20 carbon atoms, cycloalkyl groups having 3 to 20 carbon atoms, cycloalkenyl groups having 3 to 20 carbon atoms, halogen-substituted cycloalkyl groups having 3 to 20 carbon atoms, halogen-substituted cycloalkenyl groups having 3 to 20 carbon atoms, aromatic hydrocarbon groups having 6 to 24 carbon atoms, and halogen-substituted aromatic hydrocarbon groups having 6 to 24 carbon atoms.

Examples of the heteroatom-containing group represented by $R^1$ and $R^2$ include nitrogen atom-containing hydrocarbon groups terminated by a carbon atom, oxygen atom-containing hydrocarbon groups terminated by a carbon atom, phosphorus-containing hydrocarbon groups terminated by a carbon atom, and silicon-containing hydrocarbon groups terminated by a carbon atom.

Examples of the linear alkyl groups having 1 to 24 carbon atoms that may be represented by $R^1$ and $R^2$ include a methyl group, an ethyl group, an n-propyl group, an n-butyl group, an n-pentyl group, an n-hexyl group, an n-pentyl group, an n-octyl group, an n-nonyl group, an n-decyl group, and the like. Among these, linear alkyl groups having 1 to 12 carbon atoms are preferable.

Examples of the branched alkyl groups having 3 to 20 carbon atoms that may be represented by $R^1$ and $R^2$ include alkyl groups that include a secondary carbon atom or a tertiary carbon atom (e.g., isopropyl group, isobutyl group, t-butyl group, isopentyl group, and neopentyl group). Among these, branched alkyl groups having 3 to 12 carbon atoms are preferable.

Examples of the linear alkenyl groups having 3 to 20 carbon atoms that may be represented by $R^1$ and $R^2$ include an allyl group, a 3-butenyl group, a 4-hexenyl group, a 5-hexenyl group, a 7-octenyl group, a 10-dodecenyl group, and the like. Among these, linear alkenyl groups having 3 to 12 carbon atoms are preferable. Examples of the branched alkenyl groups having 3 to 20 carbon atoms include an isopropenyl group, an isobutenyl group, an isopentenyl group, a 2-ethyl-3-hexenyl group, and the like. Among these, branched alkenyl groups having 3 to 12 carbon atoms are preferable.

Examples of the linear halogen-substituted alkyl groups having 1 to 20 carbon atoms that may be represented by $R^1$ and $R^2$ include a methyl halide group, an ethyl halide group, an n-propyl halide group, an n-butyl halide group, an n-pentyl halide group, an n-hexyl halide group, an n-pentyl halide group, an n-octyl halide group, a nonyl halide group, a decyl halide group, a halogen-substituted undecyl group, a halogen-substituted dodecyl group, and the like. Among these, linear halogen-substituted alkyl groups having 1 to 12 carbon atoms are preferable. Examples of the branched halogen-substituted alkyl groups having 3 to 20 carbon atoms include an isopropyl halide group, an isobutyl halide group, a 2-ethylhexyl halide group, a neopentyl halide group, and the like. Among these, branched halogen-substituted alkyl groups having 3 to 12 carbon atoms are preferable.

Examples of the linear halogen-substituted alkenyl groups having 2 to 20 carbon atoms that may be represented by $R^1$ and $R^2$ include a 2-halogenated vinyl group, a 3-halogenated allyl group, a 3-halogenated 2-butenyl group, a 4-halogenated 3-butenyl group, a perhalogenated 2-butenyl group, a 6-halogenated 4-hexenyl group, a 3-trihalogenated methyl-2-propenyl group, and the like. Among these, halogen-substituted alkenyl groups having 2 to 12 carbon atoms are preferable. Examples of the branched halogen-substituted alkenyl groups having 3 to 20 carbon atoms include a 3-trihalogenated 2-butenyl group, a 2-pentahalogenated ethyl-3-hexenyl group, a 6-halogenated 3-ethyl-4-hexenyl group, a 3-halogenated isobutenyl group, and the like. Among these, branched halogen-substituted alkenyl groups having 3 to 12 carbon atoms are preferable.

Examples of the cycloalkyl groups having 3 to 20 carbon atoms that may be represented by $R^1$ and $R^2$ include a cyclopropyl group, a cyclobutyl group, a cyclopentyl group, a tetramethylcyclopentyl group, a cyclohexyl group, a methylcyclohexyl group, a cycloheptyl group, a cyclooctyl group, a cyclononyl group, a cyclodecyl group, a butylcyclopentyl group, and the like. Among these, cycloalkyl groups having 3 to 12 carbon atoms are preferable. Examples of the cycloalkenyl groups having 3 to 20 carbon atoms include a cyclopropenyl group, a cyclopentenyl group, a cyclohexenyl group, a cyclooctenyl group, a norbornene group, and the like. Among these, cycloalkenyl groups having 3 to 12 carbon atoms are preferable.

Examples of the halogen-substituted cycloalkyl groups having 3 to 20 carbon atoms that may be represented by $R^1$ and $R^2$ include a halogen-substituted cyclopropyl group, a halogen-substituted cyclobutyl group, a halogen-substituted cyclopentyl group, a halogen-substituted trimethylcyclopentyl group, a halogen-substituted cyclohexyl group, a halogen-substituted methylcyclohexyl group, a halogen-substituted cycloheptyl group, a halogen-substituted cyclooctyl group, a halogen-substituted cyclononyl group, a halogen-substituted cyclodecyl group, a halogen-substituted butylcyclopentyl group, and the like. Among these, halogen-substituted cycloalkyl groups having 3 to 12 carbon atoms are preferable.

Examples of the halogen-substituted cycloalkenyl groups having 3 to 20 carbon atoms that may be represented by $R^1$ and $R^2$ include a halogen-substituted cyclopropenyl group, a halogen-substituted cyclobutenyl group, a halogen-substituted cyclopentenyl group, a halogen-substituted trimethylcyclopentenyl group, a halogen-substituted cyclohexenyl group, a halogen-substituted methylcyclohexenyl group, a halogen-substituted cycloheptenyl group, a halogen-substituted cyclooctenyl group, and halogen-substituted cyclononenyl group, a halogen-substituted cyclodecenyl group, a halogen-substituted butylcyclopentenyl group, and the like. Among these, halogen-substituted cycloalkenyl groups having 3 to 12 carbon atoms are preferable.

Examples of the aromatic hydrocarbon groups having 6 to 24 carbon atoms that may be represented by $R^1$ and $R^2$ include a phenyl group, a methylphenyl group, a dimethylphenyl group, an ethylphenyl group, a benzyl group, a 1-phenylethyl group, a 2-phenylethyl group, a 2-phenylpropyl group, a 1-phenylbutyl group, a 4-phenylbutyl group, a 2-phenylheptyl group, a tolyl group, a xylyl group, a naphthyl group, a 1,8-dimethylnaphthyl group, and the like. Among these, aromatic hydrocarbon groups having 6 to 12 carbon atoms are preferable.

Examples of the halogen-substituted aromatic hydrocarbon group having 6 to 24 carbon atoms that may be represented by $R^1$ and $R^2$ include a phenyl halide group, a methylphenyl halide group, a methylphenyl trihalide group, a benzyl perhalide group, a phenyl perhalide group, a 2-phenyl-2-halogenated ethyl group, a naphthyl perhalide group, a 4-phenyl-2,3-dihalogenated butyl group, and the like. Among these, halogen-substituted aromatic hydrocarbon groups having 6 to 12 carbon atoms are preferable.

Examples of the halogen atom included in the halogen-substituted alkyl groups, the halogen-substituted alkenyl groups, the halogen-substituted cycloalkyl groups, the halogen-substituted cycloalkenyl groups, and the halogen-substituted aromatic hydrocarbon groups that may be represented by $R^1$ and $R^2$ include a fluorine atom, a chlorine atom, a bromine atom, and an iodine atom. Among these, a fluorine atom, a chlorine atom, and a bromine atom are preferable.

Examples of the nitrogen atom-containing hydrocarbon groups terminated by a carbon atom that may be represented by $R^1$ and $R^2$ (excluding a nitrogen atom-containing hydrocarbon group terminated by a C=N group) include alkylaminoalkyl groups such as a methylaminomethyl group, a dimethylaminomethyl group, a ethylaminomethyl group, a diethylaminomethyl group, a propylaminomethyl group, a dipropylaminomethyl group, a methylaminoethyl group, a dimethylaminoethyl group, a ethylaminoethyl group, a diethylaminoethyl group, a propylaminoethyl group, a dipropylaminoethyl group, a butylaminoethyl group, a dibutylaminoethyl group, a pentylaminoethyl group, a dipentylaminoethyl group, a hexylaminoethyl group, a hexylmethylaminoethyl group, a heptylmethylaminoethyl group, a diheptylaminomethyl group, a octylmethylaminomethyl group, a dioctylaminoethyl group, a nonylaminomethyl group, a dinonylaminomethyl group, a decylaminomethyl group, a didecylamino group, a cyclohexylaminomethyl group, and a dicyclohexylaminomethyl group, arylaminoalkyl groups and alkylarylaminoalkyl groups such as a phenylaminomethyl group, a diphenylaminomethyl group, a ditolylaminomethyl group, a dinaphthylaminomethyl group, and a methylphenylaminoethyl group, polycyclic aminoalkyl groups, amino group-containing aromatic hydrocarbon groups such as an anilino group, a dimethylaminophenyl group, and a bisdimethylaminophenyl group, iminoalkyl groups such as a methyliminomethyl group, an ethyliminoethyl group, a propylimino group, and a butylimino group, a phenylimino group, and the like. Among these, nitrogen atom-containing hydrocarbon groups having 2 to 12 carbon atoms are preferable. Note that the expression "terminated by" used herein in connection with $R^1$ and $R^2$ means that $R^1$ or $R^2$ is bonded to the adjacent oxygen atom through an atom or a group by which $R^1$ or $R^2$ is terminated.

Examples of the oxygen atom-containing hydrocarbon groups (having 2 to 24 carbon atoms) terminated by a carbon atom that may be represented by $R^1$ and $R^2$ (excluding an oxygen atom-containing hydrocarbon group terminated by a carbonyl group) include ether group-containing hydrocarbon groups such as a methoxymethyl group, an ethoxymethyl group, a propoxymethyl group, a butoxymethyl group, an isopropoxymethyl group, an isobutoxymethyl group, a methoxyethyl group, an ethoxyethyl group, a propoxyethyl group, a butoxyethyl group, an isopropoxyethyl group, and an isobutoxyethyl group, aryloxyalkyl groups such as a phenoxymethyl group, a methylphenoxymethyl group, a dimethylphenoxymethyl group, and a naphthoxymethyl group, alkoxyaryl groups such as a methoxyphenyl group and an ethoxyphenyl group, an acetoxymethyl group, and the like. Among these, oxygen atom-containing hydrocarbon groups having 2 to 12 carbon atoms are preferable. Note that the expression "terminated by" used herein in connection with $R^1$ and $R^2$ means that $R^1$ or $R^2$ is bonded to the adjacent oxygen atom through an atom or a group by which $R^1$ or $R^2$ is terminated.

Examples of the phosphorus-containing hydrocarbon groups terminated by a carbon atom that may be represented by $R^1$ and $R^2$ (excluding a phosphorus-containing hydrocarbon group terminated by a C=P group) include dialkylphosphinoalkyl groups such as a dimethylphosphinomethyl group, a dibutylphosphinomethyl group, a dicyclohexylphosphinomethyl group, a dimethylphosphinoethyl group, a dibutylphosphinoethyl group, and a dicyclohexylphosphinoethyl group, diarylphosphinoalkyl groups such as a diphenylphosphinomethyl group and a ditolylphosphinomethyl group, phosphino group-substituted aryl groups such as a dimethylphosphinophenyl group and a diethylphosphinophenyl group, and the like. Among these, phosphorus-containing hydrocarbon groups having 2 to 12 carbon atoms are preferable. Note that the expression "terminated by" used herein in connection with $R^1$ and $R^2$ means that $R^1$ or $R^2$ is bonded to the adjacent oxygen atom through an atom or a group by which $R^1$ or $R^2$ is terminated.

Examples of the silicon-containing hydrocarbon groups (having 1 to 24 carbon atoms) terminated by a carbon atom that may be represented by $R^1$ and $R^2$ include a hydrocarbon-substituted silyl group, a hydrocarbon-substituted siloxyalkyl group, a hydrocarbon-substituted silylalkyl group, a hydrocarbon-substituted silylaryl group, and the like. Specific examples of the silicon-containing hydrocarbon group having 1 to 24 carbon atoms include hydrocarbon-substituted silyl groups such as a phenylsilyl group, a diphenylsilyl group, a trimethylsilyl group, a triethylsilyl group, a tripropylsilyl group, a tricyclohexylsilyl group, a triphenylsilyl group, a methyldiphenylsilyl group, a tritolylsilyl group, and a trinaphthylsilyl group, siloxy hydrocarbon groups such as a trimethylsiloxymethyl group, a trimethylsiloxyethyl group, and a trimethylsiloxyphenyl group, hydrocarbon-substituted silyl ether groups such as a trimethyl silyl ether group, silicon-substituted alkyl groups such as a trimethylsilylmethyl group, silicon-substituted aryl groups such as a trimethylsilylphenyl group, and the like. Among these, silicon-containing hydrocarbon groups having 1 to 12 carbon atoms are preferable.

$R^1$ is preferably a linear alkyl group having 1 to 12 carbon atoms, a branched alkyl group having 3 to 12 carbon atoms, a vinyl group, a linear or branched alkenyl group having 3 to 12 carbon atoms, a linear halogen-substituted alkyl group having 1 to 12 carbon atoms, a branched halogen-substituted alkyl group having 3 to 12 carbon atoms, a linear or branched halogen-substituted alkenyl group having 3 to 12 carbon atoms, a cycloalkyl group having 3 to 12 carbon atoms, a cycloalkenyl group having 3 to 12 carbon atoms, a halogen-substituted cycloalkyl group having 3 to 12 carbon atoms, a halogen-substituted cycloalkenyl group having 3 to 12 carbon atoms, or an aromatic hydrocarbon group having 6 to 12 carbon atoms. $R^1$ is more preferably a linear alkyl group having 1 to 12 carbon atoms, a branched alkyl group having 3 to 12 carbon atoms, a vinyl group, a linear or branched alkenyl group having 3 to 12 carbon atoms, a linear halogen-substituted alkyl group having 1 to 12 carbon atoms, a branched halogen-substituted alkyl group having 3 to 12 carbon atoms, a cycloalkyl group having 3 to 12 carbon atoms, a cycloalkenyl group having 3 to 12 carbon atoms, or an aromatic hydrocarbon group having 6 to 12 carbon atoms. $R^1$ is particularly preferably a linear alkyl group having 1 to 12 carbon atoms, a branched alkyl group having 3 to 12 carbon atoms, or an aromatic hydrocarbon group having 6 to 12 carbon atoms.

$R^2$ is preferably a linear alkyl group having 1 to 12 carbon atoms, a branched alkyl group having 3 to 12 carbon atoms that is terminated by —$CH_2$—, a vinyl group, a linear alkenyl group having 3 to 12 carbon atoms, a branched alkenyl group having 3 to 12 carbon atoms that is terminated by —$CH_2$—, a linear halogen-substituted alkyl group having 1 to 12 carbon atoms that is terminated by —$CH_2$—, a branched halogen-substituted alkyl group having 3 to 12 carbon atoms that is terminated by —$CH_2$—, a linear halogen-substituted alkenyl group having 3 to 12 carbon atoms, a branched halogen-substituted alkenyl group having 3 to 12 carbon atoms that is terminated by —$CH_2$—, a cycloalkyl group having 4 to 12 carbon atoms that is terminated by —$CH_2$—, a cycloalkenyl group having 4 to 12 carbon atoms that is terminated by —$CH_2$—, a halogen-substituted cycloalkyl group having 4 to 12 carbon atoms that is terminated by —$CH_2$—, a halogen-substituted cycloalkenyl group having 4 to 12 carbon atoms that is terminated by —$CH_2$—, or an aromatic hydrocarbon group having 7 to 12 carbon atoms that is terminated by —$CH_2$—. $R^2$ is more preferably a linear alkyl group having 1 to 12 carbon atoms, a branched alkyl group having 3 to 12 carbon atoms that is terminated by —$CH_2$—, a branched alkenyl group having 3 to 12 carbon atoms that is terminated by —$CH_2$—, a linear halogen-substituted alkyl group having 1 to 12 carbon atoms that is terminated by —$CH_2$—, a branched halogen-substituted alkyl group having 3 to 12 carbon atoms that is terminated by —$CH_2$—, a branched halogen-substituted alkenyl group having 3 to 12 carbon atoms that is terminated by —$CH_2$—, a cycloalkyl group having 4 to 12 carbon atoms that is terminated by —$CH_2$—, a cycloalkenyl group having 4 to 12 carbon atoms that is terminated by —$CH_2$—, a halogen-substituted cycloalkyl group having 4 to 12 carbon atoms that is terminated by —$CH_2$—, a halogen-substituted cycloalkenyl group having 4 to 12 carbon atoms that is terminated by —$CH_2$—, or an aromatic hydrocarbon group having 7 to 12 carbon atoms that is terminated by —$CH_2$—. $R^2$ is particularly preferably a linear alkyl group having 1 to 12 carbon atoms, a branched alkyl group having 3 to 12 carbon atoms that is terminated by —$CH_2$—, or an aromatic hydrocarbon group having 7 to 12 carbon atoms that is terminated by —$CH_2$—. Note that the expression "terminated by" used herein in connection with $R^2$ means that $R^2$ is bonded to the adjacent oxygen atom through an atom or a group by which $R^2$ is terminated.

The two oxygen atoms bonded to Z are bonded through a carbon chain. Examples of the linking group in which the carbon chain includes two carbon atoms include a group represented by the following general formula (2).

$$—CR^3R^4CR^5R^6— \qquad (2)$$

wherein $R^3$ to $R^6$ are a hydrogen atom, a halogen atom, an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, or a substituted aromatic hydrocarbon group having 7 to 12 carbon atoms, provided that $R^3$ to $R^6$ are either identical or different, and optionally bond to each other to form a ring. $R^3$ to $R^6$ are preferably a hydrogen atom or an alkyl group having 1 to 12 carbon atoms.

Z is preferably a linear alkylene group having 1 to 20 carbon atoms, a branched alkylene group having 3 to 20 carbon atoms, a vinylene group, a linear or branched alkenylene group having 3 to 20 carbon atoms, a linear halogen-substituted alkylene group having 1 to 20 carbon atoms, a branched halogen-substituted alkylene group having 3 to 20 carbon atoms, a linear or branched halogen-substituted alkenylene group having 3 to 20 carbon atoms, a cycloalkylene group having 3 to 20 carbon atoms, a cycloalkenylene group having 3 to 20 carbon atoms, a halogen-substituted cycloalkylene group having 3 to 20 carbon atoms, a halogen-substituted cycloalkenylene group having 3 to 20 carbon atoms, an aromatic hydrocarbon group having 6 to 24 carbon atoms, a halogen-substituted aromatic hydrocarbon group having 6 to 24 carbon atoms, a nitrogen atom-containing hydrocarbon group having 1 to 24 carbon atoms, an oxygen atom-containing hydrocarbon group having 1 to 24 carbon atoms, a phosphorus-containing hydrocarbon group having 1 to 24 carbon atoms, or a silicon-containing hydrocarbon group having 1 to 24 carbon atoms.

Z is more preferably an ethylene group, a branched alkylene group having 3 to 12 carbon atoms, a vinylene group, a linear or branched alkenylene group having 3 to 12 carbon atoms, a linear halogen-substituted alkylene group having 2 to 12 carbon atoms, a branched halogen-substituted alkylene group having 3 to 12 carbon atoms, a linear or branched halogen-substituted alkenylene group having 3 to 12 carbon atoms, a cycloalkylene group having 3 to 12 carbon atoms, a cycloalkenylene group having 3 to 12 carbon atoms, a halogen-substituted cycloalkylene group having 3 to 12 carbon atoms, a halogen-substituted cycloalkenylene group having 3 to 12 carbon atoms, an aromatic hydrocarbon group having 6 to 12 carbon atoms, a halogen-substituted aromatic hydrocarbon group having 6 to 12 carbon atoms, a nitrogen atom-containing hydrocarbon group having 2 to 12 carbon atoms, an oxygen atom-containing hydrocarbon group having 2 to 12 carbon atoms, a phosphorus-containing hydrocarbon group having 2 to 12 carbon atoms, or a silicon-containing hydrocarbon group having 2 to 12 carbon atoms. Z is particularly preferably a bidentate linking group selected from an ethylene group and branched alkylene groups having 3 to 12 carbon atoms. Note that the term "bidentate linking group" means that the two oxygen atoms bonded to Z are bonded through a carbon chain, and the carbon chain includes two carbon atoms.

Examples of the linear alkylene group having 1 to 20 carbon atoms that may be represented by Z include an ethylene group, a trimethylene group, a tetramethylene group, a pentamethylene group, a hexamethylene group, a heptamethylene group, an octamethylene group, a nonamethylene group, a decamethylene group, an undecamethylene group, a dodecamethylene group, a tridecamethylene group, a tetradecamethylene group, and the like. Among these, linear alkylene groups having 2 to 12 carbon atoms are preferable. An ethylene group is more preferable.

Examples of the branched alkylene group having 3 to 20 carbon atoms that may be represented by Z include a 1-methylethylene group, a 2-methyltrimethylene group, a 2-methyltetramethylene group, a 2-methylpentamethylene group, a 3-methylhexamethylene group, a 4-methylheptamethylene group, a 4-methyloctamethylene group, a 5-methylnonamethylene group, a 5-methyldecamethylene group, a 6-methylundecamethylene group, a 7-methyldodecamethylene group, a 7-methyltridecamethylene group, and the like. Among these, branched alkylene groups having 3 to 12 carbon atoms are preferable. A 1-methylethylene group, a 2-methylethylene group, and a 1-ethylethylene group are more preferable.

Examples of the linear alkenylene group having 3 to 20 carbon atoms that may be represented by Z include a propenylene group, a butenylene group, a hexenylene group, an octenylene group, an octadecenylene group, and the like. Among these, linear alkenylene groups having 3 to 12 carbon atoms are preferable.

Examples of the branched alkenylene group having 3 to 20 carbon atoms that may be represented by Z include an isopropenylene group, a 1-ethylethenylene group, a 2-methylpropenylene group, a 2,2-dimethylbutenylene group, a 3-methyl-2-butenylene group, a 3-ethyl-2-butenylene group, a 2-methyloctenylene group, a 2,4-dimethyl-2-butenylene group, and the like. Among these, branched alkenylene groups having 3 to 12 carbon atoms that include an ethenylene group are preferable. An isopropenylene group and a 1-ethylethenylene group are more preferable.

Examples of the linear halogen-substituted alkenylene group having 1 to 20 carbon atoms that may be represented by Z include a dichloroethenylene group, a difluoroethenylene group, a 3,3-dichloropropenylene group, a 1,2-difluoropropenylene group, and the like. Among these, linear halogen-substituted alkenylene groups having 3 to 12 carbon atoms are preferable.

Examples of the branched halogen-substituted alkylene group having 1 to 20 carbon atoms that may be represented by Z include a 3,4-dichloro-1,2-butylene group, a 2,2-dichloro-1,3-butylene group, a 1,2-difluoro-1,2-propylene group, and the like. Among these, branched halogen-substituted alkylene groups having 3 to 12 carbon atoms are preferable.

Examples of the cycloalkylene group having 3 to 20 carbon atoms that may be represented by Z include a cyclopentylene group, a cyclohexylene group, a cyclopropylene group, a 2-methylcyclopropylene group, a cyclobutylene group, a 2,2-dimethylcyclobutylene group, a 2,3-dimethylcyclopentylene group, a 1,3,3-trimethylcyclohexylene group, a cyclooctylene group, and the like. Among these, cycloalkylene groups having 3 to 12 carbon atoms are preferable.

Examples of the cycloalkenylene group having 3 to 20 carbon atoms that may be represented by Z include a cyclopentenylene group, a 2,4-cyclopentadienylene group, a cyclohexenylene group, a 1,4-cyclohexadienylene group, a cycloheptenylene group, a methylcyclopentenylene group, a methylcyclohexenylene group, a methylcycloheptenylene group, a dicyclodecylene group, a tricyclodecylene group, and the like. Among these, cycloalkenylene groups having 3 to 12 carbon atoms are preferable.

Examples of the halogen-substituted cycloalkylene group having 3 to 20 carbon atoms that may be represented by Z include a 3-chloro-1,2-cyclopentylene group, a 3,4,5,6-tetrachloro-1,2-cyclohexylene group, a 3,3-dichloro-1,2-cyclopropylene group, a 2-chloromethylcyclopropylene group, a 3,4-dichloro-1,2-cyclobutylene group, a 3,3-bis(dichloromethyl)-1,2-cyclobutylene group, a 2,3-bis(dichloromethyl)cyclopentylene group, a 1,3,3-tris(fluoromethyl)-1,2-cyclohexylene group, a 3-trichloromethyl-1,2-cyclooctylene group, and the like. Among these, halogen-substituted cycloalkylene groups having 3 to 12 carbon atoms are preferable.

Examples of the halogen-substituted cycloalkenylene group having 3 to 20 carbon atoms that may be represented by Z include a 5-chloro-1,2-cyclo-4-hexenylene group, a 3,3,4,4-tetrafluoro-1,2-cyclo-6-octenylene group, and the like. Among these, halogen-substituted cycloalkenylene groups having 3 to 12 carbon atoms are preferable.

Examples of the aromatic hydrocarbon group having 6 to 24 carbon atoms that may be represented by Z include a 1,2-phenylene group, a 3-methyl-1,2-phenylene group, a 3,6-dimethyl-1,2-phenylene group, a 1,2-naphthylene group, a 2,3-naphthylene group, a 5-methyl-1,2-naphthylene group, a 9,10-phenanthrylene group, a 1,2-anthracenylene group, and the like. Among these, aromatic hydrocarbon groups having 6 to 12 carbon atoms are preferable.

Examples of the halogen-substituted aromatic hydrocarbon group having 6 to 24 carbon atoms that may be represented by Z include a 3-chloro-1,2-phenylene group, a 3-chloromethyl-1,2-phenylene group, a 3,6-dichloro-1,2-phenylene group, a 3,6-dichloro-4,5-dimethyl-1,2-phenylene group, a 3-chloro-1,2-naphthylene group, a 3-fluoro-1,2-naphthylene group, a 3,6-dichloro-1,2-phenylene group, a 3,6-difluoro-1,2-phenylene group, a 3,6-dibromo-1,2-phenylene group, a 1-chloro-2,3-naphthylene group, a 5-chloro-1,2-naphthylene group, a 2,6-dichloro-9,10-phenanthrylene group, a 5,6-dichloro-1,2-anthracenylene group, a 5,6-difluoro-1,2-anthracenylene, and the like. Among these, halogen-substituted aromatic hydrocarbon groups having 6 to 12 carbon atoms are preferable.

Examples of the nitrogen atom-containing hydrocarbon group having 1 to 24 carbon atoms that may be represented by Z include a 1-dimethylaminoethylene group, a 1,2-bisdimethylaminoethylene group, a 1-diethylaminoethylene group, a 2-diethylamino-1,3-propylene group, a 2-ethylamino-1,3-propylene group, a 4-dimethylamino-1,2-phenylene group, a 4,5-bis(dimethylamino)phenylene group, and the like. Among these, nitrogen atom-containing hydrocarbon groups having 2 to 12 carbon atoms are preferable.

Examples of the oxygen atom-containing hydrocarbon group having 1 to 24 carbon atoms that may be represented by Z include a 1-methoxyethylene group, a 2,2-dimethoxy-1,3-propanylene group, a 2-ethoxy-1,3-propanylene group, a 2-t-butoxy-1,3-propanylene group, a 2,3-dimethoxy-2,3-butylene group, a 4-methoxy-1,2-phenylene group, and the like. Among these, oxygen atom-containing hydrocarbon groups having 2 to 12 carbon atoms are preferable.

Examples of the phosphorus-containing hydrocarbon group having 1 to 24 carbon atoms that may be represented by Z include a 1-dimethylphosphinoethylene group, a 2,2- bis(dimethylphosphino)-1,3-propanylene group, a 2-diethylphosphino-1,3-propanylene group, a 2-t-butoxymethylphosphino-1,3-propanylene group, a 2,3-bis(diphenylphospino)-2,3-butylene group, a 4-methylphosphate-1,2-phenylene group, and the like. Among these, phosphorus-containing hydrocarbon groups having 1 to 12 carbon atoms are preferable.

Examples of the silicon-containing hydrocarbon group having 1 to 24 carbon atoms that may be represented by Z include a trimethylsilylethylene group, a 1,2-bis(trimethylsilyl)ethylene group, a 1,2-bis(trimethylsiloxy)ethylene group, a 2,2-bis(4-trimethylsilylphenyl)-1,3-propanylene group, a 1,2-bis(monomethylsilane)ethylene group, and the like. Among these, silicon-containing hydrocarbon groups having 1 to 12 carbon atoms are preferable.

Examples of a particularly preferable compound represented by the general formula (1) include (2-methoxyethyl) methyl carbonate, (2-ethoxyethyl) methyl carbonate, (2-propoxyethyl) methyl carbonate, (2-butoxyethyl) methyl carbonate, (2-(2-ethoxyethyloxy)ethyl) methyl carbonate, (2-benzyloxyethyl) methyl carbonate, (2-methoxypropyl) methyl carbonate, (2-ethoxypropyl) methyl carbonate, (2-methyl-2-methoxybutyl) methyl carbonate, (2-methyl-2-ethoxybutyl) methyl carbonate, (2-methyl-2-methoxypentyl) methyl carbonate, (2-methyl-2-ethoxypentyl) methyl carbonate, (1-phenyl-2-methoxypropyl) methyl carbonate, (1-phenyl-2-ethoxypropyl) methyl carbonate, (1-phenyl-2-benzyloxypropyl) methyl carbonate, (1-phenyl-2-methoxyethyl) methyl carbonate, (1-phenyl-2-ethoxyethyl) methyl carbonate, (1-methyl-1-phenyl-2-methoxyethyl) methyl carbonate, (1-methyl-1-phenyl-2-ethoxyethyl) methyl carbonate, (1-methyl-1-phenyl-2-benzyloxyethyl) methyl carbonate, (1-methyl-1-phenyl-2-(2-ethoxyethyloxy)ethyl) methyl carbonate, (2-methoxyethyl) ethyl carbonate, (2-ethoxyethyl) ethyl carbonate,
(1-phenyl-2-methoxyethyl) ethyl carbonate, (1-phenyl-2-ethoxyethyl) ethyl carbonate, (1-phenyl-2-propoxyethyl) ethyl carbonate, (1-phenyl-2-butoxyethyl) ethyl carbonate, (1-phenyl-2-isobutyloxyethyl) ethyl carbonate, (1-phenyl-2-(2-ethoxyethyloxy)ethyl) ethyl carbonate, (1-methyl-1-phenyl-2-methoxyethyl) ethyl carbonate, (1-methyl-1-phenyl-2-ethoxyethyl) ethyl carbonate, (1-methyl-1-phenyl-2-propoxyethyl) ethyl carbonate, (1-methyl-1-phenyl-2-butoxyethyl) ethyl carbonate, (1-methyl-1-phenyl-2-isobutyloxyethyl) ethyl carbonate, (1-methyl-1-phenyl-2-benzyloxyethyl) ethyl carbonate, (1-methyl-1-phenyl-2-(2-ethoxyethyloxy)ethyl) ethyl carbonate, (2-methoxyethyl) phenyl carbonate, (2-ethoxyethyl) phenyl carbonate, (2-propoxyethyl) phenyl carbonate, (2-butoxyethyl) phenyl carbonate, (2-isobutyloxyethyl) phenyl carbonate, (2-benzyloxyethyl) phenyl carbonate, (2-(2-ethoxyethyloxy) ethyl) phenyl carbonate, (2-methoxyethyl) p-methylphenyl carbonate, (2-ethoxyethyl) p-methylphenyl carbonate, (2-propoxyethyl) p-methylphenyl carbonate, (2-butoxyethyl) p-methylphenyl carbonate, (2-isobutyloxyethyl) p-methylphenyl carbonate, (2-benzyloxyethyl) p-methylphenyl carbonate, (2-(2-ethoxyethyloxy)ethyl) p-methylphenyl carbonate, (2-methoxyethyl) o-methylphenyl carbonate, (2-ethoxyethyl) o-methylphenyl carbonate, (2-propoxyethyl) o-methylphenyl carbonate, (2-butoxyethyl) o-methylphenyl carbonate, (2-isobutyloxyethyl) o-methylphenyl carbonate, (2-benzyloxyethyl) o-methylphenyl carbonate, (2-(2-ethoxyethyloxy)ethyl) o-methylphenyl carbonate, (2-methoxyethyl) o,p-dimethylphenyl carbonate, (2-ethoxyethyl) o,p-dimethylphenyl carbonate, (2-propoxyethyl) o,p-dimethylphenyl carbonate, (2-butoxyethyl) o,p-dimethylphenyl carbonate, (2-isobutyloxyethyl) o,p-dimethylphenyl carbonate, (2-benzyloxyethyl) o,p-dimethylphenyl carbonate, (2-(2-ethoxyethyloxy)ethyl) o,p-dimethylphenyl carbonate, (2-methoxypropyl) phenyl carbonate, (2-ethoxypropyl) phenyl carbonate, (2-propoxypropyl) phenyl carbonate, (2-butoxypropyl) phenyl carbonate, (2-isobutyloxypropyl) phenyl carbonate, (2-(2-ethoxyethyloxy)propyl) phenyl carbonate,
(2-phenyl-2-methoxyethyl) phenyl carbonate, (2-phenyl-2-ethoxyethyl) phenyl carbonate, (2-phenyl-2-propoxyethyl) phenyl carbonate, (2-phenyl-2-butoxyethyl) phenyl carbonate, (2-phenyl-2-isobutyloxyethyl) phenyl carbonate, (2-phenyl-2-(2-ethoxyethyloxy)ethyl) phenyl carbonate,
(1-phenyl-2-methoxypropyl) phenyl carbonate, (1-phenyl-2-ethoxypropyl) phenyl carbonate, (1-phenyl-2-propoxypropyl) phenyl carbonate, (1-phenyl-2-isobutyloxypropyl) phenyl carbonate, (1-phenyl-2-methoxyethyl) phenyl carbonate, (1-phenyl-2-ethoxyethyl) phenyl carbonate, (1-phenyl-2-propoxyethyl) phenyl carbonate, (1-phenyl-2-butoxyethyl) phenyl carbonate, (1-phenyl-2-isobutyloxyethyl) phenyl carbonate, (1-phenyl-2-(2-ethoxyethyloxy)ethyl) phenyl carbonate,
(1-methyl-1-phenyl-2-methoxyethyl) phenyl carbonate, (1-methyl-1-phenyl-2-ethoxyethyl) phenyl carbonate, (1-methyl-1-phenyl-2-propoxyethyl) phenyl carbonate, (1-methyl-1-phenyl-2-butoxyethyl) phenyl carbonate, (1-methyl-1-phenyl-2-isobutyloxyethyl) phenyl carbonate, (1-methyl-1-phenyl-2-benzyloxyethyl) phenyl carbonate, and (1-methyl-1-phenyl-2-(2-ethoxyethyloxy)ethyl) phenyl carbonate. The compound represented by the general formula (1) is particularly preferably one or more compounds selected from (2-ethoxyethyl) methyl carbonate, (2-ethoxyethyl) ethyl carbonate, (2-propoxyethyl) propyl carbonate, (2-butoxyethyl) butyl carbonate, (2-butoxyethyl) ethyl carbonate, (2-ethoxyethyl) propyl carbonate, (2-ethoxyethyl) phenyl carbonate, and (2-ethoxyethyl) p-methylphenyl carbonate. Among these, one or more compounds selected from (2-ethoxyethyl) methyl carbonate, (2-ethoxyethyl) ethyl carbonate, (2-propoxyethyl) ethyl carbonate, (2-butoxyethyl) ethyl carbonate, (2-ethoxyethyl) phenyl carbonate, and (2-ethoxyethyl) p-methylphenyl carbonate are yet more preferable. The compounds represented by the general formula (1) may be used either alone or in combination.

A 2-substituted 1,3-diether is preferable as the ether compound (B) that includes two or more ether groups. Examples of the 2-substituted 1,3-diether include a compound represented by the following general formula (3).

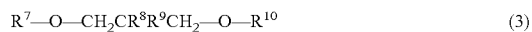

$$R^7-O-CH_2CR^8R^9CH_2-O-R^{10} \quad (3)$$

wherein $R^8$ and $R^9$ are a hydrogen atom, a halogen atom, an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a halogen-substituted aromatic hydrocarbon group having 6 to 12 carbon atoms, a substituted aromatic hydrocarbon group having 7 to 12 carbon atoms, an alkylamino group having 1 to 12 carbon atoms, or a dialkylamino group having 2 to 12 carbon atoms, provided that $R^8$ and $R^9$ are either identical or different, and optionally bond to each other to form a ring, and $R^7$ and $R^{10}$ are an alkyl group having 1 to 12 carbon atoms, a vinyl group, an alkenyl group having 3 to 12 carbon atoms, a cycloalkyl group having 3 to 6 carbon atoms, an aromatic hydrocarbon group having 6 to 12 carbon atoms, a halogen-substituted aromatic hydrocarbon group having 6 to 12 carbon atoms, or a substituted aromatic hydrocarbon group having 7 to 12 carbon atoms, provided that $R^7$ and $R^{10}$ are either identical or different.

Specific examples of the 2-substituted 1,3-diether include 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)-1,3-dimethoxypropane, 9,9-bis(methoxymethyl)fluorene, and the like. Among these, 2-isopropyl-2-isobutyl-1,3-dimethoxypropane, 2-isopropyl-2-isopentyl-1,3-dimethoxypropane, 9,9-bis(methoxymethyl)fluorene, and the like are preferable. These compounds may be used either alone or in combination.

The solid catalyst component (I) may include an electron donor compound other than the component (A) represented by the general formula (1) and the component (B) (hereinafter may be referred to as "component (E)"). Examples of the component (E) include alcohols, phenols, acid halides, acid amides, nitriles, acid anhydrides, ether compounds other than the component (B), organic acid esters, silicates, compounds that include an ether group and an ester group, and the like.

The solid catalyst component (I) may include a polysiloxane (hereinafter may be referred to as "component (F)"). The polysiloxane improves the stereoregularity or the crystallinity of the resulting polymer, and reduces production of a fine powder. A polysiloxane is a polymer that includes a siloxane linkage (—Si—O—) in the main chain, and is also referred to as "silicone oil". The polysiloxane may be a chain-like, partially hydrogenated, cyclic, or modified polysiloxane that is liquid or viscous at room temperature, and has a viscosity at 25° C. of 0.02 to 100 cm²/s (2 to 10,000 cSt), and preferably 0.03 to 5 cm²/s (3 to 500 cSt).

The content of titanium, magnesium, the halogen atom, the component (A), and the component (B) in the solid catalyst component (I) is not particularly limited. The content of titanium in the solid catalyst component (I) is normally 0.1 to 10 wt %, preferably 0.5 to 8.0 wt %, and particularly preferably 1.0 to 5.0 wt %. The content of magnesium in the solid catalyst component (I) is normally 10 to 40 wt %, preferably 10 to 30 wt %, and particularly preferably 13 to 25 wt %. The content of the halogen atom in the solid catalyst component (I) is normally 20 to 89 wt %, preferably 30 to 85 wt %, and particularly preferably 40 to 75 wt %. The total content of the component (A) and the component (B) in the solid catalyst component (I) is normally 0.5 to 40 wt %, preferably 1 to 30 wt %, and particularly preferably 2 to 25 wt %. The molar ratio ((A)/(B)) of the component (A) to the component (B) is 2.5 or more, and preferably 3 to 10. The content of the component (B) per gram of the solid catalyst component is 0.02 mmol or more, and preferably 0.04 to 0.5 mmol.

The solid catalyst component (I) may include a reagent that includes silicon, phosphorus, or a metal (e.g., aluminum) in addition to the above components. Examples of the reagent include an organosilicon compound that includes an Si—O—C linkage, an organosilicon compound that includes an Si—N—C linkage, a phosphoric acid compound that includes a P—O linkage, an organoaluminum compound (e.g., trialkylaluminum, dialkoxyaluminum chloride, alkoxyaluminum dihalide, and trialkoxyaluminum), and an aluminum trihalide. Among these, an organosilicon compound that includes an Si—O—C linkage, an organosilicon compound that includes an Si—N—C linkage, and an organoaluminum compound are preferable. When the solid catalyst component (I) includes such a reagent, the polymerization activity of the resulting solid catalyst component and the stereoregularity of the resulting polymer can be improved.

Examples and specific examples of the organosilicon compound that includes an Si—O—C linkage and the organosilicon compound that includes an Si—N—C linkage include those mentioned later in connection with the organosilicon compound represented by the general formula (5) and the organosilicon compound represented by the general formula (6). Examples of the organoaluminum compound include those mentioned later in connection with the organoaluminum compound represented by the general formula (4). These reagents may be used either alone or in combination.

Method for Producing Solid Catalyst Component (I)

The solid catalyst component (I) is produced by bringing a magnesium compound (C), a titanium compound (D) or a halogen-containing titanium compound, an optional halogen compound other than the halogen-containing titanium compound, the compound (A) represented by the general formula (1), and the ether compound (B) that includes two or more ether groups, into contact with each other.

Examples of the magnesium compound (C) (hereinafter may be referred to as "component (C)") include one or more magnesium compounds selected from a magnesium dihalide, a dialkylmagnesium, an alkylmagnesium halide, a dialkoxymagnesium, a diaryloxymagnesium, an alkoxymagnesium halide, a fatty acid magnesium salt, and the like. Among these, a magnesium dihalide, a mixture of a magnesium dihalide and a dialkoxymagnesium, and a dialkoxymagnesium are preferable, and a dialkoxymagnesium is particularly preferable.

Examples of the dialkoxymagnesium include dimethoxymagnesium, diethoxymagnesium, dipropoxymagnesium, dibutoxymagnesium, ethoxymethoxymagnesium, ethoxypropoxymagnesium, butoxyethoxymagnesium, and the like. These dialkoxymagnesiums may be prepared by reacting metallic magnesium with an alcohol in the presence of a halogen, a halogen-containing metal compound, or the like. These dialkoxymagnesiums may be used either alone or in combination.

The component (C) may be used in the form of a magnesium compound solution or a magnesium compound suspension. When the component (C) is solid, the component (C) is dissolved in a solvent that can dissolve the component (C) to prepare a magnesium compound solution, or suspended in a solvent that cannot dissolve the component (C) to prepare a magnesium compound suspension. When the component (C) is liquid, the component (C) may be used directly as a magnesium compound solution, or may be dissolved in a solvent that can dissolve the component (C) to prepare a magnesium compound solution.

Examples of the titanium compound (D) (hereinafter may be referred to as "component (D)") include a tetravalent titanium compound represented by the following general formula (7).

$$Ti(OR^{17})_j X_{4-j} \qquad (7)$$

wherein $R^{17}$ is a hydrocarbon group having 1 to 10 carbon atoms, provided that a plurality of $R^{17}$ are either identical or different when a plurality of $OR^{17}$ are present, X is a halogen atom, provided that a plurality of X are either identical or different when a plurality of X are present, and j is an integer from 0 to 4.

The tetravalent titanium compound represented by the general formula (7) is one compound or two or more compounds selected from alkoxytitaniums, titanium halides, and alkoxytitanium halides. Specific examples of the tetravalent titanium compound include titanium tetrahalides such as titanium tetrafluoride, titanium tetrachloride, titanium tetrabromide, and titanium tetraiodide, alkoxytitanium trihalides such as methoxytitanium trichloride, ethoxytitanium trichloride, propoxytitanium trichloride, and n-butoxytitanium trichloride, dialkoxytitanium dihalides such as dimethoxytitanium dichloride, diethoxytitanium dichloride, dipropoxytitanium dichloride, and di-n-butoxytitanium dichloride, and trialkoxytitanium halides such as trimethoxytitanium chloride, triethoxytitanium chloride, tripropoxytitanium chloride, and tri-n-butoxytitanium chloride. Among these, halogen-containing titanium compounds are preferable, titanium tetrahalides such as titanium tetrachloride, titanium tetrabromide, and titanium tetraiodide are more preferable, and titanium tetrachloride is particularly preferable. These titanium compounds may be used either alone or in a combination. The tetravalent titanium compound represented by the general formula (7) may be used in a state in which the tetravalent titanium compound is diluted with a hydrocarbon compound, a halogenated hydrocarbon compound, or the like.

A halogen compound other than the component (D) may optionally be used to produce the solid catalyst component (I). Examples of the halogen compound include tetravalent halogen-containing silicon compounds. Specific examples of the halogen compound include silane tetrahalides such as tetrachlorosilane (silicon tetrachloride) and tetrabromosilane, and alkoxy group-containing halogenated silanes such as methoxytrichlorosilane, ethoxytrichlorosilane, propoxytrichlorosilane, n-butoxytrichlorosilane, dimethoxydichlorosilane, diethoxydichlorosilane, dipropoxydichlorosilane, di-n-butoxydichlorosilane, trimethoxychlorosilane, triethoxychlorosilane, tripropoxychlorosilane, and tri-n-butoxychlorosilane.

The component (A) and the component (B) used to produce the solid catalyst component (I) are the same as the component (A) and the component (B) included in the solid catalyst component (I), and description thereof is omitted. The electron donor compound (E) other than the component (A) and the component (B) that is optionally used to produce the solid catalyst component (I) is the same as the electron donor compound (E) that is optionally included in the solid catalyst component (I), and description thereof is omitted. The component (F) that is optionally used to produce the solid catalyst component (I) is the same as the component (F) that is optionally included in the solid catalyst component (I), and description thereof is omitted.

The solid catalyst component (I) may preferably be produced by a method that co-grinds a solid magnesium compound that does not have a reducing capability, the component (A), the component (B), and a titanium halide, a method that brings a magnesium halide compound that includes an alcohol or the like, the component (A), the component (B), and a titanium halide into contact with each other in the presence of an inert hydrocarbon solvent, a method that brings a dialkoxymagnesium, the component (A), the component (B), and a titanium halide into contact with each other in the presence of an inert hydrocarbon solvent, a method that brings a magnesium compound having a reducing capability, the component (A), the component (B), and a titanium halide into contact with each other to precipitate a solid catalyst, or the like.

Specific examples of the method for producing the solid catalyst component (I) are described below. In the following methods (1) to (5), the component (A) and the component (B) may be used either simultaneously or successively. The components may be brought into contact with each other in the presence of a reagent (e.g., silicon, phosphorus, or aluminum) or a surfactant.

(1) Metallic magnesium, butyl chloride, and a dialkyl ether are reacted to synthesize an organomagnesium compound, and an alkoxytitanium is reacted with the organomagnesium compound to obtain a solid product. The component (A), the component (B), and a titanium halide are simultaneously or successively reacted with the solid product to produce the solid catalyst component (I). In this case, the solid component may be subjected to preliminary polymerization using an organoaluminum compound, an organosilicon compound, and an olefin to produce the solid catalyst component (I).

(2) An organomagnesium compound such as a dialkylmagnesium and an organoaluminum compound are reacted with an alcohol in the presence of a hydrocarbon solvent to obtain a homogeneous solution, and a silicon compound such as silicon tetrachloride is brought into contact with the solution to obtain a solid product. A titanium halide, the component (A), and the component (B) are reacted with the solid product in the presence of an aromatic hydrocarbon solvent, and titanium tetrachloride is brought into contact with the resulting product to produce the solid catalyst component (I).

(3) A dialkoxymagnesium is suspended in a hydrocarbon solvent, and brought into contact with titanium tetrachloride. The mixture is heated, and brought into contact with the component (A) and the component (B) either simultaneously or successively to obtain a solid product. The solid product is washed with a hydrocarbon solvent, and brought into contact with titanium tetrachloride in the presence of a hydrocarbon solvent to produce the solid catalyst component (I). In this case, the solid component may be heated in the presence or absence of a hydrocarbon solvent. A treatment with the component (E) may optionally be added.

(4) A dialkoxymagnesium is suspended in a hydrocarbon solvent, and brought into contact with a titanium halide, the component (A), and the component (B) to obtain a solid product. The solid product is washed with an inert organic solvent, and brought into contact with a titanium halide in the presence of a hydrocarbon solvent to produce the solid catalyst component (I). In this case, the solid component and a titanium halide may be brought into contact with each other two or more times.

(5) A dialkoxymagnesium, the component (A), and the component (B) are suspended in a hydrocarbon solvent, and brought into contact (reacted) with a titanium halide to obtain a solid product. The solid product is washed with a hydrocarbon solvent, and brought into contact with a titanium halide in the presence of a hydrocarbon solvent to produce the solid catalyst component (I).

When using the methods (1) to (5), a titanium halide and a hydrocarbon solvent may be brought into contact with the washed solid catalyst component (I) at 20 to 100° C., the mixture may be heated to effect a reaction (secondary reaction), and washed with an inert organic solvent that is liquid at room temperature, and the above operation may be repeated 1 to 10 times in order to further improve the polymerization activity when polymerizing the olefin and the stereoregularity of the resulting polymer.

The solid catalyst component (I) may be produced using any of the methods (1) to (5). It is preferable to produce the solid catalyst component (I) by suspending a dialkoxymagnesium, the component (A), and the component (B) in a hydrocarbon solvent selected from a linear hydrocarbon, a branched aliphatic hydrocarbon, an alicyclic hydrocarbon, and an aromatic hydrocarbon, adding the suspension to a titanium halide to effect a reaction to obtain a solid product, washing the solid product with a hydrocarbon solvent, and bringing the component (B) (or the component (A)) into contact with the solid product in the presence of a hydrocarbon solvent.

It is also preferable to bring the solid catalyst component (I) obtained by the above method into contact with the organosilicon compound that includes an Si—O—C linkage, the organosilicon compound that includes an Si—N—C linkage, and the organoaluminum compound (optional), from the viewpoint of improving the polymerization activity and the hydrogen response of the solid catalyst component. The solid catalyst component (I) is brought into contact with these compounds in the presence of a hydrocarbon solvent. After bringing the solid catalyst component (I) into contact with each of the other components, the mixture is sufficiently washed with a hydrocarbon solvent to remove unnecessary substances. The solid catalyst component (I) may be repeatedly brought into contact with the above compounds.

The components are brought into contact with each other at −10 to 100° C., preferably 0 to 90° C., and particularly preferably 20 to 80° C. The contact time is 1 minute to 10 hours, preferably 10 minutes to 5 hours, and particularly preferably 30 minutes to 2 hours. The components may be brought into contact with each other in an arbitrary ratio as long as the advantageous effects of the invention are not adversely affected. The organosilicon compound that includes an Si—O—C linkage, and the organosilicon compound that includes an Si—N—C linkage are normally used in an amount of 0.2 to 20 mol, preferably 0.5 to 10 mol, and particularly preferably 1 to 5 mol, per mol of the titanium atoms included in the solid catalyst component (I). The organoaluminum compound is normally used in an amount of 0.5 to 50 mol, preferably 1 to 20 mol, and particularly preferably 1.5 to 10 mol, per mol of the titanium atoms included in the solid catalyst component (I).

It is preferable to remove the solvent from the resulting solid catalyst component (I) so that the weight ratio of the solvent relative to the solid component is 1/3 or less, and preferably 1/6 to 1/20 to obtain a powdery solid component.

The ratio of the components used when producing the solid catalyst component (I) is determined depending on the production method. For example, the tetravalent titanium halide compound (D) is used in an amount of 0.5 to 100 mol, preferably 0.5 to 50 mol, and still more preferably 1 to 10 mol, based on 1 mol of the magnesium compound (C). The component (A) and the component (B) are used in a total amount of 0.01 to 10 mol, preferably 0.01 to 1 mol, and still more preferably 0.02 to 0.6 mol, based on 1 mol of the magnesium compound (C). The solvent is used in an amount of 0.001 to 500 mol, preferably 0.001 to 100 mol, and still more preferably 0.005 to 10 mol, based on 1 mol of the magnesium compound (C). The polysiloxane (F) is used in an amount of 0.01 to 100 g, preferably 0.05 to 80 g, and still more preferably 1 to 50 g, based on 1 mol of the magnesium compound (C).

The olefin polymerization catalyst includes the solid catalyst component (I), an organoaluminum compound (II) (hereinafter may be referred to as "component (G)"), and an external electron donor compound (III) (hereinafter may be referred to as "component (H)"). Note that the component (H) may not be used when the solid catalyst component (I) includes the organosilicon compound that includes an Si—O—C linkage, the organosilicon compound that includes an Si—N—C linkage, or the organoaluminum compound (reagent). Specifically, the catalyst formed of the solid catalyst component and the organoaluminum compound exhibits excellent polymerization activity and excellent hydrogen response even when the component (H) is not used.

The organoaluminum compound (II) is not particularly limited as long as the organoaluminum compound (II) is a compound represented by the general formula (4). Note that $R^{11}$ is preferably an ethyl group or an isobutyl group, Q is preferably a hydrogen atom, a chlorine atom, a bromine atom, an ethoxy group, or a phenoxy group, and p is preferably 2, 2.5, or 3, and particularly preferably 3.

Specific examples of the organoaluminum compound include trialkylaluminums such as triethylaluminum, triisopropylaluminum, tri-n-butylaluminum, tri-n-hexylaluminum, and triisobutylaluminum, alkylaluminum halides such as diethylaluminum chloride and diethylaluminum bromide, diethylaluminum hydride, and the like. Among these, alkylaluminum halides such as diethylaluminum chloride, and trialkylaluminums such as triethylaluminum, tri-n-butylaluminum, and triisobutylaluminum are preferable, and triethylaluminum and triisobutylaluminum are particularly preferable. These organoaluminum compounds may be used either alone or in combination.

Examples of the external electron donor compound (III) used to produce the olefin polymerization catalyst according to one embodiment of the invention include organic compounds that include an oxygen atom or a nitrogen atom. Examples of the organic compounds that include an oxygen atom or a nitrogen atom include alcohols, phenols, ethers, esters, ketones, acid halides, aldehydes, amines, amides, nitriles, isocyanates, and organosilicon compounds. The external electron donor compound (III) may be an organosilicon compound that includes an Si—O—C linkage, an aminosilane compound that includes an Si—N—C linkage, or the like.

Among these, esters such as ethyl benzoate, ethyl p-methoxybenzoate, ethyl p-ethoxybenzoate, methyl p-toluate, ethyl p-toluate, methyl anisate, and ethyl anisate, 1,3-diethers, organosilicon compounds that include an Si—O—C linkage, and aminosilane compounds that include an Si—N—C linkage are preferable, and organosilicon compounds that include an Si—O—C linkage, aminosilane compounds that include an Si—N—C linkage, and 2-substituted 1,3-diethers are particularly preferable.

Examples of the organosilicon compounds that include an Si—O—C linkage and may be used as the external electron donor compound (III) include an organosilicon compound represented by the following general formula (5).

$$R^{12}_q Si(OR^{13})_{4-q} \qquad (5)$$

wherein $R^{12}$ is an alkyl group having 1 to 12 carbon atoms, a vinyl group, an allyl group, an aralkyl group, a cycloalkyl group having 3 to 12 carbon atoms, a phenyl group, an alkylamino group having 1 to 12 carbon atoms, or a dialkylamino group having 1 to 12 carbon atoms, q is an integer that satisfies $0<q\leq3$, provided that a plurality of $R^{12}$ are either identical or different when q is equal to or larger than 2, and $R^{13}$ is an alkyl group having 1 to 4 carbon atoms, a cycloalkyl group having 3 to 6 carbon atoms, a phenyl group, a vinyl group, an allyl group, or an aralkyl group, provided that a plurality of $R^{13}$ are either identical or different when a plurality of $R^{13}$ are present.

Examples of the aminosilane compounds that include an Si—N—C linkage and may be used as the external electron donor compound (III) include an aminosilane compound represented by the following general formula (6).

$$(R^{14}R^{15}N)_s SiR^{16}_{4-s} \qquad (6)$$

wherein $R^{14}$ and $R^{15}$ are a hydrogen atom, a linear alkyl group having 1 to 20 carbon atoms, a branched alkyl group having 3 to 20 carbon atoms, a vinyl group, an aralkyl group, an alkenyl group having 3 to 20 carbon atoms, a cycloalkyl group having 3 to 20 carbon atoms, a cycloalkenyl group having 3 to 20 carbon atoms, or an aryl group having 6 to 20 carbon atoms, provided that $R^{14}$ and $R^{15}$ are either identical or different, and optionally bond to each other to form a ring, $R^{16}$ is a linear alkyl group having 1 to 20 carbon atoms, a branched alkyl group having 3 to 20 carbon atoms, a vinyl group, an aralkyl group, an alkenyl group having 3 to 12 carbon atoms, a cycloalkyl group having 3 to 20 carbon atoms, or an aryl group having 6 to 20 carbon atoms, provided that a plurality of $R^{16}$ are either identical or different when a plurality of $R^{16}$ are present, and s is an integer from 1 to 3.

Examples of the organosilicon compound represented by the general formula (5) or (6) include phenylalkoxysilanes, alkylalkoxysilanes, phenylalkylalkoxysilanes, cycloalkylalkoxysilanes, alkyl(cycloalkyl)alkoxysilanes, (alkylamino)alkoxysilanes, alkyl(alkylamino)alkoxysilanes, cycloalkyl(alkylamino)alkoxysilanes, tetraalkoxysilanes, tetrakis(alkylamino)silanes, alkyltris(alkylamino)silanes, dialkylbis(alkylamino)silanes, trialkyl(alkylamino)silanes, and the like.

Examples of the 2-substituted 1,3-diethers include those mentioned above in connection with the component (B) (i.e., internal electron donor compound).

In one embodiment of the invention, an olefin is homopolymerized or copolymerized in the presence of the olefin polymerization catalyst. Examples of the olefin include ethylene, propylene, 1-butene, 3-methyl-1-butene, 1-pentene, 4-methyl-1-pentene, 1-hexene, vinylcyclohexane, and the like. These olefins may be used either alone or in combination. Among these, ethylene, propylene, and 1-butene are preferable. A particularly preferable olefin is propylene.

When polymerizing propylene, propylene may be copolymerized with another olefin. Examples of the olefin that is copolymerized with propylene include ethylene, 1-butene, 3-methyl-1-butene, 1-pentene, 4-methyl-1-pentene, 1-hexene, vinylcyclohexane, 1-octene, and the like. These olefins may be used either alone or in combination. Among these, ethylene and 1-butene are preferable.

The components are used in an arbitrary ratio as long as the advantageous effects of the invention are not impaired. The component (G) is normally used in an amount of 1 to 2000 mol, and preferably 50 to 1000 mol, per mol of the titanium atoms included in the solid catalyst component (I). The component (H) is used in an amount of 0.002 to 10 mol, preferably 0.01 to 2 mol, and particularly preferably 0.01 to 0.5 mol, per mol of the component (G).

The components may be brought into contact with each other in an arbitrary order. It is desirable to add the component (G) to the polymerization system, bring the component (H) into contact with the component (G), and bring the component (I) into contact with the above mixture. The olefin may be polymerized in the presence or absence of an organic solvent. The olefin monomer such as propylene may be used in a gaseous state or a liquid state. The polymerization temperature is 200° C. or less, and preferably at 100° C. or less. The polymerization pressure is 10 MPa or less, and preferably 5 MPa or less. A continuous polymerization method or a batch polymerization method may be employed. The polymerization reaction may be effected by one step, or may be effected by two or more steps.

When polymerizing the olefin using the catalyst that includes the solid catalyst component for olefin polymerization, the organoaluminum compound, and the external electron donor compound (hereinafter may be referred to as "main polymerization"), it is desirable to effect preliminary polymerization prior to the main polymerization in order to further improve the catalytic activity, the stereoregularity, the particle properties of the resulting polymer, and the like. The olefin that is subjected to the main polymerization or a monomer such as styrene may be used for the preliminary polymerization.

The components and the monomer may be brought into contact with each other in an arbitrary order during the preliminary polymerization. Note that it is preferable to add the component (G) to the preliminary polymerization system containing an inert gas atmosphere or an olefin gas atmosphere, bring the solid catalyst component (I) into contact with the component (G), and then bring the olefin (e.g., propylene) or a mixture of propylene and one or more additional olefins into contact with the above mixture.

When effecting the preliminary polymerization using the component (H), it is desirable to add the component (G) to the preliminary polymerization system containing an inert gas atmosphere or an olefin gas atmosphere, bring the component (H) into contact with the component (G), bring the solid catalyst component (I) into contact with the above mixture, and then bring the olefin (e.g., propylene) or a mixture of propylene and one or more additional olefins into contact with the above mixture.

Examples of the polymerization method include a slurry polymerization method that utilizes an inert hydrocarbon solvent such as hexane, cyclohexane, or heptane, a bulk polymerization method that utilizes a solvent such as liquefied propylene, and a gas-phase polymerization method that substantially does not use a solvent. The bulk polymerization method and the gas-phase polymerization method are preferable.

In one embodiment of the invention, propylene and an α-olefin are copolymerized in the presence of the olefin polymerization catalyst to produce a propylene-based copolymer. Propylene may be homopolymerized, or propylene and ethylene may be copolymerized in the presence of the olefin polymerization catalyst, and propylene and ethylene, or propylene and another α-olefin may then be copolymerized. The α-olefin is at least one olefin selected from α-olefins having 2 to 20 carbon atoms (excluding propylene). Examples of the α-olefin include ethylene, 1-butene, 3-methyl-1-butene, 1-pentene, 4-methyl-1-pentene, vinylcyclohexane, and the like. These α-olefins may be used either alone or in combination. Among these, ethylene and 1-butene are preferable. A particularly preferable α-olefin is ethylene.

Examples of the copolymerization method include a slurry polymerization method that utilizes an inert hydrocarbon solvent such as cyclohexane or heptane, a bulk polymerization method that utilizes a solvent such as liquefied propylene, and a gas-phase polymerization method that substantially does not use a solvent. A block copolymer can be obtained by repeatedly implementing such a polymerization method. A preferable copolymerization method is a combination of the bulk polymerization method and the gas-phase polymerization method, or a multi-step gas-phase polymerization method.

It is preferable to homopolymerize propylene, or copolymerize propylene and a small amount of α-olefin (particularly ethylene) in the first step, and copolymerize propylene and an α-olefin (particularly ethylene), or copolymerize propylene, ethylene, and 1-butene in the second step. Note that the first step and the second step may respectively implemented a plurality of times.

It is preferable to effect polymerization in the first step while adjusting the polymerization temperature and the polymerization time so that 20 to 90 wt % of the propylene-based block copolymer is obtained. It is preferable to introduce propylene and ethylene or another α-olefin in the second step, and polymerize the components so that the ratio of the rubber part such as an ethylene-propylene rubber (EPR) or an ethylene-propylene-1-butene ternary copolymer is 10 to 80 wt %.

The polymerization temperature in the first step and the second step is 200° C. or less, and preferably 100° C. or less. The polymerization pressure in the first step and the second step is 10 MPa or less, and preferably 5 MPa or less. The polymerization time in each polymerization step (or the residence time when using continuous polymerization) is normally 1 minute to 5 hours. The copolymerization method may be a continuous polymerization method or a batch polymerization method. Each of the first-step polymerization reaction and the second-step polymerization reaction may be implemented by a single step or a plurality of steps. When the first-step polymerization reaction or the second-step polymerization reaction is implemented by a plurality of steps, each step may be implemented under identical conditions or different conditions. It is preferable to implement the second-step polymerization reaction by a gas-phase polymerization reaction since elution of EPR from PP particles can be suppressed.

The catalyst components may be used for copolymerization in an arbitrary ratio as long as the advantageous effects of the invention are not impaired. The organoaluminum compound (G) is normally used in an amount of 1 to 2000 mol, and preferably 50 to 1000 mol, per mol of the titanium atoms included in the solid catalyst component (I). The external electron donor compound (H) is normally used in an amount of 0.002 to 10 mol, preferably 0.01 to 2 mol, and particularly preferably 0.01 to 0.5 mol, per mol of the component (G). The components may be brought into contact with each other in an arbitrary order. It is desirable to add the organoaluminum compound (G) to the polymerization system, and bring the component (I) into contact with the organoaluminum compound (G).

When copolymerizing the olefin using the catalyst that includes the solid catalyst component, the organoaluminum compound, and the external electron donor compound (hereinafter may be referred to as "main polymerization"), it is desirable to effect preliminary polymerization prior to the main polymerization in order to further improve the catalytic activity, the stereoregularity, the particle properties of the resulting polymer, and the like. The olefin that is subjected to the main polymerization or a monomer such as styrene may be used for the preliminary polymerization.

The components and the monomer may be brought into contact with each other in an arbitrary order during the preliminary polymerization. Note that it is preferable to add the component (G) to the preliminary polymerization system containing an inert gas atmosphere or an olefin gas atmosphere, bring the solid catalyst component (I) into contact with the component (G), and then bring the olefin (e.g., propylene) or a mixture of propylene and one or more additional olefins into contact with the above mixture.

When effecting the preliminary polymerization using the component (H), it is desirable to add the component (G) to the preliminary polymerization system containing an inert gas atmosphere or an olefin gas atmosphere, bring the component (H) into contact with the component (G), bring the solid catalyst component (I) into contact with the above mixture, and then bring the olefin (e.g., propylene) or a mixture of propylene and one or more additional olefins into contact with the above mixture.

A larger amount of rubber component can be incorporated in the copolymer under identical polymerization conditions by utilizing the polymerization catalyst obtained according to one embodiment of the invention, and the resulting block copolymer can be applied to a wide range of products. Moreover, the rubber part polymerization sustainability is high, and the properties of the rubber part can be controlled by multi-step polymerization.

A block copolymer is normally a polymer that includes segments in which the composition of two or more monomers changes consecutively. Specifically, a block copolymer is normally a polymer in which two or more polymer chains (segments) that differ in polymer primary structure (e.g., type of monomer, type of comonomer, comonomer composition, comonomer content, comonomer sequence, and stereoregularity) are linked in one molecular chain. The propylene-based block copolymer obtained by the method according to one embodiment of the invention is characterized in that polymers that differ in monomer composition are produced by multi-step polymerization. Specifically, the main part of the propylene-based block copolymer has a structure in which two or more polymers that differ in monomer composition are present in each polymer particle in a mixed state (some of the polymers are linked through the polymer chain).

The propylene-based block copolymer obtained by the method according to one embodiment of the invention exhibits moderate rigidity due to the presence of crystalline polypropylene, or a crystalline polypropylene-based random copolymer that includes crystalline polypropylene and a small amount of α-olefin (e.g., ethylene) (crystalline PP or homopolymerization part), and exhibits excellent impact resistance due to the presence of a random copolymer (e.g., ethylene-propylene rubber (EPR or rubber part)) obtained by second-step polymerization. The balance between rigidity and impact resistance varies depending on the ratio of crystalline PP and the rubber part. The propylene-based block copolymer obtained by the method according to one embodiment of the invention includes the rubber part in a high ratio since the polymerization activity (block ratio) of the rubber part obtained by second-step polymerization is high. Since a large amount of α-olefin (e.g., ethylene) is introduced into the random copolymer, the copolymer exhibits relatively high rigidity with respect to the amount of rubber part and the ethylene content in the crystalline part. The copolymer exhibits high impact strength with respect to a polymer that includes an identical rubber part.

EXAMPLES

The invention is further described below by way of examples. Note that the following examples are for illustration purposes only, and the invention is not limited to the following examples.

In the examples and comparative examples, the content of magnesium atoms, titanium atoms, halogen atoms, and the internal electron donor compound in the solid catalyst component was measured as described below.

Content of Magnesium Atoms in Solid Catalyst Component

The solid catalyst component from which the solvent component had been completely removed by heating (drying) under reduced pressure was weighed, and dissolved in a hydrochloric acid solution. After the addition of methyl orange (indicator) and a saturated ammonium chloride solution, the mixture was neutralized with aqueous ammonia, heated, cooled, and filtered to remove a precipitate (titanium hydroxide). A given amount of the filtrate was isolated preparatively, and heated. After the addition of a buffer and an EBT mixed indicator, magnesium atoms were titrated using an EDTA solution to determine the content of magnesium atoms in the solid catalyst component (EDTA titration method).

Content of Titanium Atoms in Solid Catalyst Component

The content of titanium atoms in the solid catalyst component was determined in accordance with the method (oxidation-reduction titration) specified in JIS M 8311-1997 ("Method for determination of titanium in titanium ores").

Content of Halogen Atoms in Solid Catalyst Component

The solid catalyst component from which the solvent component had been completely removed by heating (drying) under reduced pressure was weighed, and treated with a mixture of sulfuric acid and purified water to obtain an aqueous solution. A given amount of the aqueous solution was isolated preparatively, and halogen atoms were titrated with a silver nitrate standard solution using an automatic titration device ("COM-1500" manufactured by Hiranuma Sangyo Co., Ltd.) to determine the content of halogen atoms in the solid catalyst component (silver nitrate titration method).

Content of Internal Electron Donor Compound in Solid Catalyst Component

The content of the internal electron donor compound in the solid catalyst component was determined using a gas chromatograph ("GC-14B" manufactured by Shimadzu Corporation) under the following conditions. The number of moles of each component (each internal electron donor compound) was calculated from the gas chromatography measurement results using a calibration curve that was drawn in advance using the measurement results at a known concentration.

Measurement Conditions

Column: packed column (2.6 (diameter)×2.1 m, Silicone SE-30 10%, Chromosorb WAW DMCS 80/100, manufactured by GL Sciences Ltd.)

Detector: flame ionization detector (FID)

Carrier gas: helium, flow rate: 40 ml/min

Measurement temperature: vaporization chamber: 280° C., column: 225° C., detector: 280° C., or vaporization chamber: 265° C., column: 180° C., detector: 265° C.

Production Example 1

Synthesis of (2-Ethoxyethyl) Phenyl Carbonate 50 g of phenyl chloroformate and 33 ml of 2-ethoxyethanol were dissolved in 300 ml of dichloromethane. After cooling the solution to 0° C. using ice water, 48 ml of triethylamine was added dropwise to the solution over 30 minutes. After the dropwise addition, the mixture was slowly heated to room temperature over 1 hour, and reacted for 12 hours. After completion of the reaction, the reaction product was purified by column separation and distillation to obtain 21 g of a product.

The product was subjected to $^1$H-NMR analysis, and it was found that the $^1$H-NMR chemical shift values were 1.25 (t, 3H), 3.58 (q, 2H), 3.73 (m, 2H), 4.40 (t, 2H), 7.17-7.41 (m, 5H). It was thus confirmed that the product was (2-ethoxyethyl) phenyl carbonate. The purity of the resulting (2-ethoxyethyl) phenyl carbonate determined by GC was 96.9%.

Production Example 2

Synthesis of (2-ethoxyethyl) ethyl carbonate 54 ml of pyridine and 30 g of 2-ethoxyethanol were dissolved in 500 ml of dichloromethane. After cooling the solution to 0° C. using ice water, 54 g of ethyl chloroformate was added dropwise to the solution over 30 minutes. After the dropwise addition, the mixture was slowly heated to room temperature over 1 hour, and reacted for 16 hours. After completion of the reaction, the reaction product was purified by column separation and distillation to obtain 53 g of a product.

The product was subjected to $^1$H-NMR analysis, and it was found that the $^1$H-NMR chemical shift values were 1.14 (t, 3H), 1.23 (t, 3H), 3.46 (q, 2H), 3.56-3.62 (m, 2H), 4.12 (q, 2H), 4.18-4.23 (m, 2H). It was thus confirmed that the product was (2-ethoxyethyl) ethyl carbonate. The purity of the resulting (2-ethoxyethyl) ethyl carbonate determined by GC was 98.0%.

Production Example 3

Synthesis of (2-ethoxyethyl) methyl carbonate 100 g of 2-ethoxyethanol was added dropwise to a mixture of 700 g of dimethyl carbonate and 230 g of potassium carbonate at 25° C. in a nitrogen atmosphere. The mixture was stirred for 16 hours, and filtered. The filtrate was concentrated, and purified by vacuum distillation to obtain 74 g of a product.

The product was subjected to $^1$H-NMR analysis, and it was found that the $^1$H-NMR chemical shift values were 1.16 (t, 3H), 3.49 (q, 2H), 3.60-3.63 (m, 2H), 3.74 (s, 3H), 4.22-4.27 (m, 2H). It was thus confirmed that the product was (2-ethoxyethyl) methyl carbonate. The purity of the resulting (2-ethoxyethyl) methyl carbonate determined by GC was 99.0%.

Production Example 4

Synthesis of (2-methoxyethyl) methyl carbonate 100 g of 2-methoxyethanol was added dropwise to a mixture of 830 g of dimethyl carbonate and 270 g of potassium carbonate at 25° C. in a nitrogen atmosphere. The mixture was stirred for 16 hours, and filtered. The filtrate was concentrated, and purified by vacuum distillation to obtain 61 g of a product.

The product was subjected to $^1$H-NMR analysis, and it was found that the $^1$H-NMR chemical shift values were 3.34 (s, 3H), 3.55-3.60 (m, 2H), 3.74 (s, 3H), 4.22-4.26 (m, 2H). It was thus confirmed that the product was (2-methoxyethyl) methyl carbonate. The purity of the resulting (2-methoxyethyl) methyl carbonate determined by GC was 99.0%.

Production Example 5

Synthesis of (2-ethoxyethyl) p-methylphenyl carbonate 62.7 g of pyridine was added to a solution of 29 g of 2-ethoxyethanol in 1000 ml of dichloromethane at 0° C.

g of p-tolylchloroformic acid was added dropwise to the mixture at 0° C. After stirring the mixture at 20° C. for 16 hours, the reaction was terminated by adding water, and the organic layer was extracted with dichloromethane. The extract was washed with salt water and a sodium hydrogen carbonate aqueous solution, concentrated, and purified by vacuum distillation to obtain 41 g of a product.

The product was subjected to $^1$H-NMR analysis, and it was found that the $^1$H-NMR chemical shift values were 1.27 (t, 3H), 2.37 (s, 3H), 3.60 (q, 2H), 3.72-3.76 (m, 2H), 4.38-4.43 (m, 2H), 7.06-7.10 (m, 2H), 7.19 (d, 2H). It was thus confirmed that the product was (2-ethoxyethyl) p-methylphenyl carbonate. The purity of the resulting (2-ethoxyethyl) p-methylphenyl carbonate determined by GC was 98%.

Example 1

Synthesis of Solid Catalyst Component (I1)

A flask (internal volume: 500 ml) equipped with a stirrer, of which the internal atmosphere had been sufficiently replaced with nitrogen gas, was charged with 10 g (87.4 mmol) of diethoxymagnesium, 55 ml of toluene, 30 ml of titanium tetrachloride, 1.46 g (9 mmol) of (2-ethoxyethyl) ethyl carbonate (A) obtained in Production Example 2, and 0.26 g (1.2 mmol) of 2-isopropyl-2-isopentyl-1,3-dimethoxypropane (B). The mixture was reacted at 100° C. for 90 minutes. After completion of the reaction, the reaction product was washed four times with 75 ml of toluene (100° C.). After the addition of 100 ml of a 10 vol % toluene solution of titanium tetrachloride, the mixture was heated to 100° C., and reacted for 15 minutes with stirring. After completion of the reaction, the product was washed once with toluene (100° C.). After repeating the above operation twice, the mixture was washed six times with 75 ml of n-heptane (40° C.) to obtain a solid catalyst component (I1). The solid catalyst component (I1) was subjected to solid-liquid separation, and the content of titanium, the content of 2-isopropyl-2-isopentyl-1,3-dimethoxypropane (B), and the content of (2-ethoxyethyl) ethyl carbonate (A) in the solid were determined, and found to be 1.9 wt %, 2.1 wt % (0.10 mmol/g-solid catalyst component), and 6.2 wt % (0.38 mmol/g-solid catalyst component), respectively. The molar ratio "A/B" was 3.8.

Preparation of Polymerization Catalyst (Y1) and Evaluation of Propylene Homopolymerization An autoclave (internal volume: 2.0 l) equipped with a stirrer, of which the internal atmosphere had been completely replaced with nitrogen gas, was charged with 1.32 mmol of triethylaluminum, 0.13 mmol of dicyclopentyldimethoxysilane (DCPDMS), and the solid catalyst component (I1) (0.0026 mmol on a titanium atom basis) to prepare a polymerization catalyst (Y1). After the addition of 1.5 l of hydrogen gas and 1.4 l of liquefied propylene, preliminary polymerization was effected at 20° C. for 5 minutes. The mixture was heated to 70° C., and polymerized at 70° C. for 1 hour. The polymerization activity per gram of the solid catalyst component, the p-xylene-soluble content (XS) in the resulting polymer, and the melt flow rate (MFR) and the molecular weight distribution (Mw/Mn) of the resulting polymer are shown in Table 1.

Polymerization Activity Per Gram of Solid Catalyst Component

The polymerization activity per gram of the solid catalyst component was calculated by the following expression.

Polymerization activity (g-PP/g-catalyst)=mass (g) of polymer/mass (g) of solid catalyst component Measurement of Xylene-Soluble Content (XS) in Polymer A flask equipped with a stirrer was charged with 4.0 g of the polymer (polypropylene) and 200 ml of p-xylene. The external temperature was increased to be equal to or higher than the boiling point of xylene (about 150° C.), and the polymer was dissolved over 2 hours while maintaining p-xylene contained in the flask at the boiling point (137 to 138° C.). The solution was cooled to 23° C. over 1 hour, and an insoluble component and a soluble component were separated by filtration. A solution of the soluble component was collected, and p-xylene was evaporated by heating and drying under reduced pressure. The weight of the residue (xylene-soluble component) was calculated as a value (wt %) relative to the weight of the polymer (polypropylene), and taken as the xylene-soluble content (XS).

Melt Flow Rate (MFR) of Polymer

The melt flow rate (MFR) (melt flow index) of the polymer was measured in accordance with ASTM D 1238 (JIS K 7210).

Measurement of Molecular Weight Distribution (Mw/Mn) of Polymer

The molecular weight distribution of the polymer was evaluated by the ratio (Mw/Mn) of the weight average molecular weight (Mw) to the number average molecular weight (Mn) determined by gel permeation chromatography (GPC) ("Alliance GPC/V2000" manufactured by Waters) under the following conditions.

Solvent: o-dichlorobenzene (ODCB)
Measurement temperature: 140° C.
Column: UT-806×3, HT-803×1 (manufactured by Showa Denko K.K.)
Sample concentration: 1 mg/ml-ODCB (10 mg/10 ml-ODCB)
Injection amount: 0.5 ml
Flow rate: 1.0 ml/min Example 2

Preparation of Polymerization Catalyst (Y2) and Evaluation of Propylene Homopolymerization A polymerization catalyst (Y2) was prepared, and polymerization was effected (evaluated) in the same manner as in Example 1, except that 0.13 mmol of diisopropyldimethoxysilane (DIPDMS) was used instead of 0.13 mmol of dicyclopentyldimethoxysilane (DCPDMS). The polymerization results are shown in Table 1.

Example 3

Preparation of Polymerization Catalyst (Y3) and Evaluation of Propylene Homopolymerization A polymerization catalyst (Y3) was prepared, and polymerization was effected (evaluated) in the same manner as in Example 1, except that 0.13 mmol of cyclohexylmethyldimethoxysilane (CMDMS) was used instead of 0.13 mmol of dicyclopentyldimethoxysilane (DCPDMS). The polymerization results are shown in Table 1.

Example 4

Preparation of Polymerization Catalyst (Y4) and Evaluation of Propylene Homopolymerization A polymerization catalyst (Y4) was prepared, and polymerization was effected (evaluated) in the same manner as in Example 1, except that 0.13 mmol of 2-isopropyl-2-isopentyl-1,3-dimethoxypropane (IIDMP) was used instead of 0.13 mmol of dicyclopentyldimethoxysilane (DCPDMS). The polymerization results are shown in Table 1.

Example 5

Synthesis of Solid Catalyst Component (I2)

A solid catalyst component (I2) was prepared in the same manner as in Example 1, except that the amount of (2-ethoxyethyl) ethyl carbonate (A) was changed from 1.46 g (9 mmol) to 2.43 g (15 mmol). The content of titanium, the content of 2-isopropyl-2-isopentyl-1,3-dimethoxypropane (B), and the content of (2-ethoxyethyl) ethyl carbonate (A) in the solid catalyst component were determined, and found to be 1.7 wt %, 1.8 wt % (0.08 mmol/g-solid catalyst component), and 8.0 wt % (0.49 mmol/g-solid catalyst component), respectively. The molar ratio "A/B" was 6.1.

Preparation of Polymerization Catalyst (Y5) and Evaluation of Propylene Homopolymerization A polymerization catalyst (Y5) was prepared, and polymerization was effected (evaluated) in the same manner as in Example 1, except that the solid catalyst component (I2) was used instead of the solid catalyst component (I1). The polymerization results are shown in Table 1.

Example 6

Synthesis of Solid Catalyst Component (I3)

A solid catalyst component (I3) was prepared in the same manner as in Example 1, except that 9 mmol of (2-ethoxyethyl) phenyl carbonate obtained in Production Example 1 was used instead of 9 mmol of (2-ethoxyethyl) ethyl carbonate (A). The content of titanium, the content of 2-isopropyl-2-isopentyl-1,3-dimethoxypropane, and the content of (2-ethoxyethyl) phenyl carbonate in the solid catalyst component were determined, and found to be 2.7 wt %, 2.0 wt % (0.09 mmol/g-solid catalyst component), and 5.1 wt % (0.24 mmol/g-solid catalyst component), respectively. 2.0 wt % (0.12 mmol/g-solid catalyst component) (2-ethoxyethyl) ethyl carbonate was included in the solid catalyst component as a by-product carbonate. Therefore, the molar ratio "A/B" was 4.0.

Preparation of Polymerization Catalyst (Y6) and Evaluation of Propylene Homopolymerization A polymerization catalyst (Y6) was prepared, and polymerization was effected (evaluated) in the same manner as in Example 1, except that the solid catalyst component (I3) was used instead of the solid catalyst component (I1). The polymerization results are shown in Table 1.

Example 7

Synthesis of Solid Catalyst Component (I4)

A solid catalyst component (I4) was prepared in the same manner as in Example 1, except that 9 mmol of (2-ethoxyethyl) methyl carbonate obtained in Production Example 3 was used instead of 9 mmol of (2-ethoxyethyl) ethyl carbonate (A). The content of titanium, the content of 2-isopropyl-2-isopentyl-1,3-dimethoxypropane, and the content of (2-ethoxyethyl) methyl carbonate in the solid catalyst component were determined, and found to be 2.0 wt %, 2.0 wt % (0.09 mmol/g-solid catalyst component), and 4.0 wt % (0.27 mmol/g-solid catalyst component), respectively. The molar ratio "A/B" was 3.0.

Preparation of Polymerization Catalyst (Y7) and Evaluation of Propylene Homopolymerization A polymerization catalyst (Y7) was prepared, and polymerization was effected (evaluated) in the same manner as in Example 1, except that the solid catalyst component (I4) was used instead of the solid catalyst component (I1). The polymerization results are shown in Table 1.

Example 8

Synthesis of Solid Catalyst Component (I5)

A solid catalyst component (I5) was prepared in the same manner as in Example 1, except that 9 mmol of (2-methoxyethyl) methyl carbonate obtained in Production Example 4 was used instead of 9 mmol of (2-ethoxyethyl) ethyl carbonate (A). The content of titanium, the content of 2-isopropyl-2-isopentyl-1,3-dimethoxypropane, and the content of (2-methoxyethyl) methyl carbonate in the solid catalyst component were determined, and found to be 1.8 wt %, 1.5 wt % (0.07 mmol/g-solid catalyst component), and 4.0 wt % (0.30 mmol/g-solid catalyst component), respectively. The molar ratio "A/B" was 4.3.

Preparation of Polymerization Catalyst (Y8) and Evaluation of Propylene Homopolymerization A polymerization catalyst (Y8) was prepared, and polymerization was effected (evaluated) in the same manner as in Example 1, except that the solid catalyst component (I5) was used instead of the solid catalyst component (I1). The polymerization results are shown in Table 1.

Example 9

Synthesis of Solid Catalyst Component (I6)

A solid catalyst component (I6) was prepared in the same manner as in Example 1, except that 9 mmol of (2-ethoxyethyl) p-methylphenyl carbonate obtained in Production Example 5 was used instead of 9 mmol of (2-ethoxyethyl) ethyl carbonate (A). The content of titanium, the content of 2-isopropyl-2-isopentyl-1,3-dimethoxypropane, and the content of (2-ethoxyethyl) p-methylphenyl carbonate in the solid catalyst component were determined, and found to be 2.2 wt %, 1.5 wt % (0.07 mmol/g-solid catalyst component), and 5.6 wt % (0.25 mmol/g-solid catalyst component), respectively. 1.5 wt % (0.09 mmol/g-solid catalyst component) of (2-ethoxyethyl) ethyl carbonate was included in the solid catalyst component as a by-product carbonate. Therefore, the molar ratio "A/B" was 4.9.

Preparation of Polymerization Catalyst (Y9) and Evaluation of Propylene Homopolymerization A polymerization catalyst (Y9) was prepared, and polymerization was effected (evaluated) in the same manner as in Example 1, except that the solid catalyst component (I6) was used instead of the solid catalyst component (I1). The polymerization results are shown in Table 1.

Example 10

Synthesis of Solid Catalyst Component (I7)

A solid catalyst component (I7) was prepared in the same manner as in Example 1, except that the amount of (2-ethoxyethyl) ethyl carbonate (A) was changed from 1.46 g (9 mmol) to 1.94 g (12 mmol), and the amount of 2-isopropyl-2-isopentyl-1,3-dimethoxypropane (B) was changed from 0.26 g (1.2 mmol) to 0.09 g (0.4 mmol). The content of titanium, the content of 2-isopropyl-2-isopentyl-1,3-dimethoxypropane (B), and the content of (2-ethoxyethyl) ethyl carbonate (A) in the solid catalyst component were determined, and found to be 2.2 wt %, 0.7 wt % (0.03 mmol/g-solid catalyst component), and 9.1 wt % (0.56 mmol/g-solid catalyst component), respectively. The molar ratio "A/B" was 18.7.

Preparation of Polymerization Catalyst (Y10) and Evaluation of Propylene Homopolymerization A polymerization catalyst (Y10) was prepared, and polymerization was effected (evaluated) in the same manner as in Example 1, except that the solid catalyst component (I7) was used instead of the solid catalyst component (I1). The polymerization results are shown in Table 1.

Example 11

Synthesis of Solid Catalyst Component (I8)

A solid catalyst component (I8) was prepared in the same manner as in Example 1, except that the amount of (2-ethoxyethyl) ethyl carbonate (A) was changed from 1.46 g (9 mmol) to 2.42 g (15 mmol), and the amount of 2-isopropyl-2-isopentyl-1,3-dimethoxypropane (B) was changed from 0.26 g (1.2 mmol) to 0.87 g (4.0 mmol). The content of titanium, the content of 2-isopropyl-2-isopentyl-1,3-dimethoxypropane (B), and the content of (2-ethoxyethyl) ethyl carbonate (A) in the solid catalyst component were determined, and found to be 1.5 wt %, 4.3 wt % (0.20 mmol/g-solid catalyst component), and 12.5 wt % (0.77 mmol/g-solid catalyst component), respectively. The molar ratio "A/B" was 3.8.

Preparation of Polymerization Catalyst (Y11) and Evaluation of Propylene Homopolymerization A polymerization catalyst (Y11) was prepared, and polymerization was effected (evaluated) in the same manner as in Example 1, except that the solid catalyst component (I8) was used instead of the solid catalyst component (I1). The polymerization results are shown in Table 1.

Comparative Example 1

Synthesis of Solid Catalyst Component (i1)

A solid catalyst component (i1) was prepared in the same manner as in Example 1, except that 2-isopropyl-2-isopentyl-1,3-dimethoxypropane was not added, and (2-ethoxyethyl) ethyl carbonate was used in the same molar amount as the total molar amount of the component (A) and the component (B). Specifically, only the component (A) was used as the internal donor in Comparative Example 1. The content of titanium and the content of (2-ethoxyethyl) ethyl carbonate in the solid catalyst component were determined, and found to be 2.4 wt % and 8.4 wt % (0.52 mmol/g-solid catalyst component), respectively.

Preparation of Polymerization Catalyst (y1) and Evaluation of Propylene Homopolymerization A polymerization catalyst (y1) was prepared, and polymerization was effected (evaluated) in the same manner as in Example 1, except that the solid catalyst component (i1) was used instead of the solid catalyst component (I1). The polymerization results are shown in Table 1.

Comparative Example 2

Synthesis of Solid Catalyst Component (i2)

A solid catalyst component (i2) was prepared in the same manner as in Example 1, except that (2-ethoxyethyl) ethyl carbonate was not added, and 2-isopropyl-2-isopentyl-1,3-dimethoxypropane was used in the same molar amount as the total molar amount of the component (A) and the component (B). Specifically, only the component (B) was used as the internal donor in Comparative Example 2. The content of titanium and the content of 2-isopropyl-2-isopentyl-1,3-dimethoxypropane in the solid catalyst component were determined, and found to be 5.4 wt % and 11.0 wt % (0.51 mmol/g-solid catalyst component), respectively.

Preparation of Polymerization Catalyst (y2) and Evaluation of Propylene Homopolymerization A polymerization catalyst (y2) was prepared, and polymerization was effected (evaluated) in the same manner as in Example 1, except that the solid catalyst component (i2) was used instead of the solid catalyst component (I1). The polymerization results are shown in Table 1.

TABLE 1

|  | Internal donor*1 | External donor*2 | Polymerization activity (g-pp/g-catalyst) | XS (wt %) | Mw/Mn | MFR (g/10 min) |
| --- | --- | --- | --- | --- | --- | --- |
| Example 1 | EEECA + IIDMP | DCPDMS | 55,700 | 1.0 | 5.0 | 3.6 |
| Example 2 | EEECA + IIDMP | DIPDMS | 52,900 | 1.4 | 4.7 | 6.8 |
| Example 3 | EEECA + IIDMP | CMDMS | 53,100 | 1.8 | 4.4 | 9.6 |
| Example 4 | EEECA + IIDMP | IIDMP | 42,000 | 2.0 | 4.3 | 27 |
| Example 5 | EEECA + IIDMP | DCPDMS | 50,000 | 0.8 | 5.3 | 3.2 |
| Example 6 | EEPCA + IIDMP | DCPDMS | 57,500 | 1.4 | 5.0 | 4.0 |
| Example 7 | EEMCA + IIDMP | DCPDMS | 46,600 | 1.1 | 5.4 | 3.8 |
| Example 8 | MEMCA + IIDMP | DCPDMS | 45,800 | 1.1 | 5.3 | 3.8 |

TABLE 1-continued

|  | Internal donor*1 | External donor*2 | Polymerization activity (g-pp/g-catalyst) | XS (wt %) | Mw/Mn | MFR (g/10 min) |
|---|---|---|---|---|---|---|
| Example 9 | EEMPCA + IIDMP | DCPDMS | 59,500 | 1.7 | 5.5 | 4.3 |
| Example 10 | EEECA + IIDMP | DCPDMS | 47,200 | 0.8 | 5.2 | 3.0 |
| Example 11 | EEECA + IIDMP | DCPDMS | 58,200 | 1.4 | 4.6 | 5.2 |
| Comparative Example 1 | EEECA | DCPDMS | 41,500 | 1.2 | 5.8 | 2.5 |
| Comparative Example 2 | IIDMP | DCPDMS | 73,700 | 2.4 | 3.8 | 26 |

EEECA: (2-ethoxyethyl) ethyl carbonate, EEPCA: (2-ethoxyethyl) phenyl carbonate, EEMCA: (2-ethoxyethyl) methyl carbonate, MEMCA: (2-methoxyethyl) methyl carbonate, EEMPCA: (2-ethoxyethyl) p-methylphenyl carbonate, IIDMP: 2-isopropyl-2-isopentyl-1,3-dimethoxypropane, DCPDMS: dicyclopentyldimethoxysilane, DIPDMS: diisopropyldimethoxysilane, CMDMS: cyclohexylmethyldimethoxysilane As is clear from the results shown in Table 1, the solid catalyst components of Examples 1 to 11 obtained using the component (A) and the component (B) as the electron donor compound exhibited an excellent balance between polymerization activity and stereoregularity, and provided a molecular weight distribution (Mw/Mn) within a moderate range (4.5 to 5.7) that ensures excellent moldability (formability) (similar to that achieved by a phthalic ester) as compared with the case where only the component (A) was used as the electron donor compound (Comparative Example 1), and the case where only the component (B) was used as the electron donor compound (Comparative Example 2).

Example 12

Synthesis of Solid Catalyst Component (I9)

A 500 ml round-bottom flask, of which the internal atmosphere had been sufficiently replaced with nitrogen, was charged with 120 ml of purified n-heptane. After the addition of 15 g of anhydrous magnesium chloride and 106 ml of tetra(n-butoxy)titanium, the mixture was reacted at 90° C. for 1.5 hours to obtain a homogenous solution. The solution was cooled to 40° C. After the addition of 24 ml of methyl hydrogen polysiloxane (viscosity: 20 cSt) while maintaining the solution at 40° C., the mixture was subjected to a precipitation reaction for 5 hours. A precipitated solid product was sufficiently washed with purified n-heptane. A 500 ml round-bottom flask equipped with a stirrer, of which the internal atmosphere had been sufficiently replaced with nitrogen, was charged with 40 g (65 mmol on a magnesium atom basis) of the solid product, and purified n-heptane was added to the flask so that the concentration of the solid product was 200 mg/ml. After the addition of 12 ml of silicon tetrachloride, the mixture was reacted at 90° C. for 3 hours. The reaction product was sufficiently washed with purified n-heptane, and purified n-heptane was added to the flask so that the concentration of the reaction product was 100 mg/ml. After the addition of 1.14 g (7 mmol) of (2-ethoxyethyl) methyl carbonate (A) obtained in Production Example 3 and 0.22 g (1.0 mmol) of 2-isopropyl-2-isopentyl-1,3-dimethoxypropane (B), the mixture was reacted at 70° C. for 1 hour. The reaction product was sufficiently washed with purified n-heptane, followed by the addition of 100 ml of purified n-heptane. After the addition of 20 ml of titanium tetrachloride, the mixture was reacted at 95° C. for 3 hours. After completion of the reaction, the supernatant liquid was removed. After the addition of 20 ml of titanium tetrachloride, the mixture was reacted at 100° C. for 2 hours. The reaction product was washed six times with purified n-heptane. The resulting solid product was dried under reduced pressure to obtain a powdery solid catalyst component (I9). The content of titanium in the solid catalyst component was 3.2 wt %. The content of 2-isopropyl-2-isopentyl-1,3-dimethoxypropane and the content of (2-ethoxyethyl) methyl carbonate in the solid catalyst component were determined, and found to be 2.2 wt % (0.10 mmol/g-solid catalyst component) and 4.8 wt % (0.32 mmol/g-solid catalyst component), respectively. The molar ratio "A/B" was 3.2.

Preparation of Polymerization Catalyst (Y12) and Evaluation of Propylene Homopolymerization A polymerization catalyst (Y12) was prepared, and polymerization was effected (evaluated) in the same manner as in Example 1, except that the solid catalyst component (I9) was used instead of the solid catalyst component (I1). The polymerization results are shown in Table 2.

Example 13

Synthesis of Solid Catalyst Component (I10)

A solid catalyst component (I10) was prepared in the same manner as in Example 1, except that 1.2 mmol of 9,9-bis(methoxymethyl)fluorene was used instead of 1.2 mmol (0.26 g) of 2-isopropyl-2-isopentyl-1,3-dimethoxypropane. The content of titanium, the content of 9,9-bis(methoxymethyl)fluorene, and the content of (2-ethoxyethyl) methyl carbonate in the solid catalyst component were determined, and found to be 2.4 wt %, 3.0 wt % (0.12 mmol/g-solid catalyst component), and 5.5 wt % (0.36 mmol/g-solid catalyst component), respectively. The molar ratio "A/B" was 3.0.

Preparation of Polymerization Catalyst (Y13) and Evaluation of Propylene Homopolymerization A polymerization catalyst (Y13) was prepared, and polymerization was effected (evaluated) in the same manner as in Example 1, except that the solid catalyst component (I10) was used instead of the solid catalyst component (I1). The polymerization results are shown in Table 2.

Example 14

Synthesis of Solid Catalyst Component (I11)

A solid catalyst component (I11) was prepared in the same manner as in Example 10, except that 1.2 mmol (0.24 g) of 2-isopropyl-2-isobutyl-1,3-dimethoxypropane was used instead of 0.4 mmol (0.09 g) of 2-isopropyl-2-isopentyl-1,3-dimethoxypropane. The content of titanium, the content of content of 2-isopropyl-2-isobutyl-1,3-dimethoxypropane, and the content of (2-ethoxyethyl) methyl carbonate in the solid catalyst component were determined, and found to be 2.1 wt %, 2.3 wt % (0.11 mmol/g-solid catalyst component) and 6.6 wt % (0.43 mmol/g-solid catalyst component), respectively. The molar ratio "A/B" was 3.0.

Preparation of Polymerization Catalyst (Y14) and Evaluation of Propylene Homopolymerization A polymerization catalyst (Y14) was prepared, and polymerization was effected (evaluated) in the same manner as in Example 1, except that the solid catalyst component (I11) was used instead of the solid catalyst component (I1). The polymerization results are shown in Table 2.

Comparative Example 3

Synthesis of Solid Catalyst Component (i3)

A solid catalyst component (i3) was prepared in the same manner as in Example 12, except that (2-ethoxyethyl) methyl carbonate (A) was not added, and the amount of 2-isopropyl-2-isopentyl-1,3-dimethoxypropane was changed from 0.22 g (1.0 mmol) to 2.2 g (10 mmol). The content of titanium and the content of 2-isopropyl-2-isopentyl-1,3-dimethoxypropane in the solid catalyst component were determined, and found to be 2.8 wt % and 12.3 wt % (0.56 mmol/g-solid catalyst component), respectively. The molar ratio "A/B" was 0.

Preparation of Polymerization Catalyst (y3) and Evaluation of Propylene Homopolymerization A polymerization catalyst (y3) was prepared, and polymerization was effected (evaluated) in the same manner as in Example 1, except that the solid catalyst component (i3) was used instead of the solid catalyst component (I1). The polymerization results are shown in Table 2.

9,9-BMMF: 9,9-bis(methoxymethyl)fluorene, IBDMP: 2-isopropyl-2-isobutyl-1,3-dimethoxypropane

Example 15

Preparation of Polymerization Catalyst (B1) and Evaluation of Propylene Block Copolymerization An autoclave (internal volume: 2.0 l) equipped with a stirrer, of which the internal atmosphere had been completely replaced with nitrogen gas, was charged with 2.4 mmol of triethylaluminum, 0.24 mmol of dicyclopentyldimethoxysilane (DCPDMS), and the solid catalyst component (I1) (0.003 mmol on a titanium atom basis) to prepare a propylene block copolymerization catalyst (B1).
Production of Propylene-Based Block Copolymer An autoclave charged with the propylene block copolymerization catalyst (B1) was charged with liquefied propylene (15 mol) and hydrogen gas (partial pressure: 0.20 MPa). The liquefied propylene was subjected to preliminary polymerization at 20° C. for 5 minutes, and subjected to first-step polymerization (homopolymerization) at 70° C. for 75 minutes. After completion of homopolymerization, the monomers were discharged while lowering the temperature of the autoclave to room temperature. The weight of the entire autoclave was measured, and the first-step polymerization amount was calculated from the difference between the measured weight of the entire autoclave and the weight measured before polymerization. The polymer was sampled in a nitrogen atmosphere for measuring the MFR. After connecting a monomer feed line and the like, ethylene, propylene, and hydrogen were fed to the autoclave equipped with a stirrer in a molar ratio of 1.0/1.0/0.043. The mixture was heated to 70° C., and polymerized at 70° C. for 1 hour under a pressure of 1.2 MPa while feeding ethylene, propylene, and hydrogen in a ratio of 2/2/0.086 (l/min) to obtain a propylene-based block copolymer.

The propylene-based block copolymerization activity (ICP (impact copolymer) activity) (g-ICP/(g-cat)) and the polymerization ratio of the copolymerization part (block ratio) (wt %) were measured to evaluate the polymerization activity sustainability. The MFR of the homopolymer, the MFR of the ICP, the EPR content (rubber content) (wt %) in the propylene-based block copolymer, the ethylene content (wt %) in the EPR, and the ethylene content (wt %) in the xylene-insoluble component were also measured. The results are shown in Table 3.
ICP Polymerization Activity The propylene-based block copolymerization activity per gram of the solid catalyst component was calculated by the following expression.

Propylene-based block copolymerization activity
(g-ICP/g-catalyst)=$(I\,(g)-F\,(g)+J(g))/[\{$mass (g) of solid catalyst component in olefin polymerization catalyst$\}\times((G\,(g)-F\,(g)-J\,(g))/(G\,(g)-F\,(g)))]$

TABLE 2

| | Internal donor*1 | External donor*2 | Polymerization activity (g-pp/g-catalyst) | XS (wt %) | Mw/Mn | MFR (g/10 min) |
|---|---|---|---|---|---|---|
| Example 12 | EEMCA + IIDMP | DCPDMS | 45,500 | 1.2 | 5.0 | 4.3 |
| Example 13 | EEMCA + 9,9-BMMF | DCPDMS | 49,900 | 1.4 | 5.1 | 5.5 |
| Example 14 | EEMCA + IBDMP | DCPDMS | 53,100 | 1.3 | 5.2 | 8.1 |
| Comparative Example 3 | IIDMP | DCPDMS | 43,000 | 2.4 | 3.4 | 6.7 |

Note that I is the mass (g) of the autoclave after completion of copolymerization, F is the mass (g) of the autoclave, G is the mass (g) of the autoclave after unreacted monomers had been removed after completion of PP homopolymerization, and J is the amount (g) of polymer removed after homopolymerization.

Block Ratio (Mass %)

Block ratio (mass %)={(I (g)−G (g)+J (g))/(I (g)−F (g))}×100

Note that I is the mass (g) of the autoclave after completion of copolymerization, G is the mass (g) of the autoclave after unreacted monomers had been removed after completion of PP homopolymerization, J is the amount (g) of polymer removed after homopolymerization, and F is the mass (g) of the autoclave.

EPR Content (Xylene-Soluble Content in ICP Polymer)

A flask equipped with a stirrer was charged with 5.0 g of the copolymer (ICP propylene polymer) and 250 ml of p-xylene. The external temperature was increased to be equal to or higher than the boiling point of xylene (about 150° C.), and the polymer was dissolved over 2 hours while maintaining p-xylene contained in the flask at the boiling point (137 to 138° C.). The solution was cooled to 23° C. over 1 hour, and an insoluble component and a soluble component were separated by filtration. A solution of the soluble component was collected, and p-xylene was evaporated by heating (drying) under reduced pressure. The weight of the residue was calculated, and the ratio (mass %) relative to the polymer (propylene-based block copolymer) was calculated to determine the EPR content.

Determination of Ethylene Content in EPR

A small amount of EPR (xylene-soluble component) that was extracted with xylene when determining the EPR content (xylene-soluble content in the ICP polymer) was sampled, and hot-pressed in the shape of a film. The ethylene content in the EPR was calculated from the absorbance measured using a Fourier transform infrared spectrometer (FT-IR) ("Avatar" manufactured by Thermo Nicolet) based on a calibration curve drawn using a plurality of samples having a known ethylene content.

Measurement wavelength: 720 cm$^{-1}$ and 1150 cm$^{-1}$
Film thickness: 0.1 to 0.2 mm Ethylene Content in Xylene-Insoluble Component A small amount of xylene-insoluble component obtained by extraction with xylene was sampled, and hot-pressed in the shape of a film, and the ethylene content in the xylene-insoluble component was calculated in the same manner as the ethylene content in the EPR.

Melt Flow Rate (MFR) of Polymer

The melt flow rate (MFR) (melt flow index) (g/10 min) of homopolypropylene and the ICP polymer was measured in accordance with ASTM D 1238 (JIS K 7210).

Example 16

A polymerization catalyst (B2) was prepared, and polymerization was effected (evaluated) in the same manner as in Example 15, except that 0.24 mmol of diisopropyldimethoxysilane (DIPDMS) was used instead of 0.24 mmol of dicyclopentyldimethoxysilane (DCPDMS). The polymerization results are shown in Table 3.

Example 17

A polymerization catalyst (B3) was prepared, and polymerization was effected (evaluated) in the same manner as in Example 15, except that 0.24 mmol of cyclohexylmethyldimethoxysilane (CMDMS) was used instead of 0.24 mmol of dicyclopentyldimethoxysilane (DCPDMS). The polymerization results are shown in Table 3.

Comparative Example 4

Preparation of Polymerization Catalyst (y4) and Production of Propylene-Based Block Copolymer A polymerization catalyst (y4) was prepared, and polymerization was effected in the same manner as in Example 15, except that the solid catalyst component (i1) was used instead of the solid catalyst component (I1). The polymerization results are shown in Table 3.

Comparative Example 5

Preparation of Polymerization Catalyst (y5) and Production of Propylene-Based Block Copolymer A polymerization catalyst (y5) was prepared, and polymerization was effected in the same manner as in Example 15, except that the solid catalyst component (i2) was used instead of the solid catalyst component (I1). The polymerization results are shown in Table 3.

TABLE 3

|  | Example 15 | Example 16 | Example 17 | Comparative Example 4 | Comparative Example 5 |
| --- | --- | --- | --- | --- | --- |
| ICP activity (g-ICP/g-catalyst) | 49,200 | 46,300 | 56,700 | 39,300 | 72,800 |
| PP-MFR (g/10 min) | 31 | 53 | 150 | 17 | 190 |
| ICP-MFR (g/10 min) | 5.8 | 13 | 47 | 2.1 | 89 |
| Block ratio (wt %) | 27.6 | 26.4 | 28.3 | 29.0 | 14.7 |
| EPR content (wt %) | 24.4 | 23.9 | 25.1 | 26.5 | 13.8 |
| Ethylene content in EPR (wt %) | 41.3 | 44.0 | 41.0 | 40.5 | 44.2 |
| Ethylene content in xylene-insoluble component (wt %) | 5.8 | 5.6 | 6.4 | 6.6 | 3.2 |

TABLE 3-continued

|  | Example 15 | Example 16 | Example 17 | Comparative Example 4 | Comparative Example 5 |
|---|---|---|---|---|---|
| Ratio of ethylene content in EPR to total ethylene content | 0.70 | 0.71 | 0.72 | 0.71 | 0.68 |

As is clear from the results shown in Table 3, the olefin polymerization catalysts prepared using the solid catalyst components obtained in the examples achieved high total polymerization yield, and also achieved high second-stage copolymerization activity when implementing multi-step copolymerization. A large amount of ethylene was introduced into the propylene-ethylene block copolymer, and excellent olefin copolymerization sustainability was achieved. Since the olefin polymerization catalysts achieved excellent impact copolymer (ICP) copolymerizability, the resulting copolymer had a high block ratio. Moreover, ethylene was efficiently introduced into the rubber part, and an excellent balance between rigidity and impact strength was achieved. As is clear from the results of Comparative Example 4, the solid catalyst component using only the diether compound as the internal electron donor compound without using the component (A) achieved poor olefin polymerization activity sustainability, and the total yield of the propylene-ethylene block copolymer was low when implementing multi-step copolymerization. Although ethylene was introduced into the random copolymer in a high ratio, the ethylene copolymer showed low activity, and the second-step copolymerization activity (block ratio), and the content of the rubber part (EPR) in the resulting copolymer were low. The ethylene content in the rubber part (EPR) relative to the total ethylene content in the copolymer was low, and the balance between rigidity and impact strength decreased.

Example 18

Synthesis of Solid Catalyst Component (I12)

A 300 ml round-bottom flask, of which the internal atmosphere had been sufficiently replaced with nitrogen, was charged with 30 ml of purified n-decane. After the addition of 5.7 g of anhydrous magnesium chloride and 28 ml of 2-ethylhexanol, the mixture was reacted at 130° C. for 2 hours to obtain a homogenous solution. After the addition of 8.8 mmol (1.43 g) of (2-ethoxyethyl) ethyl carbonate (A), the mixture was stirred for 1 hour, and cooled to room temperature. A 500 ml round-bottom flask equipped with a stirrer, of which the internal atmosphere had been sufficiently replaced with nitrogen, was charged with 240 ml of titanium tetrachloride. After cooling the flask (titanium tetrachloride) to −20° C., the above solution was added dropwise to the flask over 1 hour. After the addition, the mixture was heated to 110° C. over 2 hours. After the addition of 0.89 g (5.5 mmol) of (2-ethoxyethyl) ethyl carbonate (A) and 0.78 g (3.6 mmol) of 2-isopropyl-2-isopentyl-1,3-dimethoxypropane (B), the mixture was reacted at 110° C. for 2 hours. After completion of the reaction, the supernatant liquid was removed. After the addition of 240 ml of titanium tetrachloride, the mixture was reacted at 110° C. for 2 hours. After completion of the reaction, the reaction product was washed twice with purified n-decane (110° C.), and washed four times with purified n-hexane (40° C.). The resulting solid product was dried under reduced pressure to obtain a powdery solid catalyst component (I12). The content of titanium in the solid catalyst composition was 1.9 wt %. The content of 2-isopropyl-2-isopentyl-1,3-dimethoxypropane and the content of (2-ethoxyethyl) ethyl carbonate in the solid catalyst component were determined, and found to be 3.5 wt % (0.16 mmol/g-solid catalyst component) and 6.5 wt % (0.40 mmol/g-solid catalyst component), respectively. The molar ratio "A/B" was 2.5.

Preparation of Polymerization Catalyst (Y15) and Evaluation of Propylene Homopolymerization A polymerization catalyst (Y15) was prepared, and polymerization was effected (evaluated) in the same manner as in Example 3, except that the solid catalyst component (I12) was used instead of the solid catalyst component (I1). The polymerization results are shown in Table 4.

Comparative Example 6

Synthesis of Solid Catalyst Component (i4)

A 300 ml round-bottom flask, of which the internal atmosphere had been sufficiently replaced with nitrogen, was charged with 30 ml of purified n-decane. After the addition of 5.7 g of anhydrous magnesium chloride and 28 ml of 2-ethylhexanol, the mixture was reacted at 130° C. for 2 hours to obtain a homogenous solution. After the addition of 1.30 g (8.8 mmol) of phthalic anhydride, the mixture was stirred for 1 hour, and cooled to room temperature. A 500 ml round-bottom flask equipped with a stirrer, of which the internal atmosphere had been sufficiently replaced with nitrogen, was charged with 240 ml of titanium tetrachloride. After cooling the flask (titanium tetrachloride) to −20° C., the above solution was added dropwise to the flask over 1 hour. After the addition, the mixture was heated to 110° C. over 2 hours. After the addition of 3.32 g (11.9 mmol) of diisobutyl phthalate, the mixture was reacted at 110° C. for 2 hours. After completion of the reaction, the supernatant liquid was removed. After the addition of 240 ml of titanium tetrachloride, the mixture was reacted at 110° C. for 2 hours. After completion of the reaction, the reaction product was washed twice with purified n-decane (110° C.), and washed four times with purified n-hexane (40° C.). The resulting solid product was dried under reduced pressure to obtain a powdery solid catalyst component (i4). The content of titanium in the solid catalyst component was 3.4 wt %. The content of diisobutyl phthalate in the solid catalyst component was 13.5 wt % (0.48 mmol/g-solid catalyst component).

Preparation of Polymerization Catalyst (y6) and Evaluation of Propylene Homopolymerization A polymerization catalyst (y6) was prepared, and polymerization was effected (evaluated) in the same manner as in Example 3, except that the solid catalyst component (i4) was used instead of the solid catalyst component (I1). The polymerization results are shown in Table 4. Note that DIBP in Table 4 is diisobutyl phthalate.

TABLE 4

| | Internal donor | External donor | Polymerization activity (g-pp/g-catalyst) | XS (wt %) | Mw/Mn | MFR (g/10 min) |
|---|---|---|---|---|---|---|
| Example 18 | EEECA + IIDMP | CMDMS | 43,900 | 1.5 | 4.6 | 11 |
| Comparative Example 6 | DIBP | CMDMS | 40,400 | 2.3 | 4.8 | 17 |

Example 19

Preparation of Polymerization Catalyst (C1) and Evaluation of Gas-Phase Ethylene-Propylene Copolymerization An autoclave (internal volume: 2.0 l) equipped with a stirrer, of which the internal atmosphere had been completely replaced with nitrogen gas, was charged with 2.2 mmol of triethylaluminum, 0.22 mmol of dicyclopentyldimethoxysilane (DCPDMS), and the solid catalyst component (I1) (0.003 mmol on a titanium atom basis) to prepare a gas-phase ethylene-propylene copolymerization catalyst (C1).

Production of Ethylene-Propylene Copolymer

Propylene gas (0.1 MPa) was fed in the presence of the gas-phase ethylene-propylene copolymerization catalyst (C1) to effect preliminary polymerization at 20° C. for 5 minutes. After increasing the temperature to 60° C. in 5 minutes, ethylene, propylene, and hydrogen were fed in a ratio of 0.3/6.0/0.24 (l/min). The mixture was polymerized at 60° C. for 1 hour under a pressure of 1.0 MPa to obtain an ethylene-propylene copolymer. The copolymerization activity per gram of the solid catalyst component, the p-xylene-soluble content (XS) in the resulting polymer, the melt flow rate (MFR) of the resulting polymer, and the ethylene content (wt %) in the copolymer are shown in Table 5.

Ethylene Content in Copolymer

A small amount of the copolymer was sampled, and hot-pressed in the shape of a film, and the ethylene content in the copolymer was calculated in the same manner as the ethylene content in the EPR.

TABLE 5

| | Copolymerization activity (g-copolymer/g-catalyst) | XS (wt %) | MFR (g/10 min) | Ethylene content in copolymer (wt %) |
|---|---|---|---|---|
| Example 19 | 17,800 | 4.7 | 7.8 | 3.5 |

Example 20

Preparation of Polymerization Catalyst (C2) and Evaluation of Propylene Slurry Polymerization An autoclave (internal volume: 1.5 l) equipped with a stirrer, of which the internal atmosphere had been completely replaced with nitrogen gas, was charged with 700 ml of purified n-heptane, 2.1 mmol of triethylaluminum, 0.21 mmol of cyclohexylmethyldimethoxysilane (CMDMS), and the solid catalyst component (I1) (0.005 mmol on a titanium atom basis) to prepare a slurry polymerization catalyst (C2).

Evaluation of Propylene Slurry Polymerization

Propylene gas (0.1 MPa) was fed in the presence of the slurry polymerization catalyst (C2) to effect preliminary polymerization at 20° C. for 30 minutes. After increasing the temperature to 70° C., 100 ml of hydrogen was introduced, and propylene was polymerized at 70° C. for 2 hours under a pressure of 0.6 MPa. After completion of polymerization, the polymer liquid was filtered to obtain a propylene polymer. Heptane was vaporized from the filtrate to collect a solvent-soluble propylene polymer component. The slurry polymerization activity per gram of the solid catalyst component, the polymerization yield, the boiling heptane insoluble content (HI), the melt flow rate (MFR), the xylene-soluble content (XS), and the molecular weight distribution (Mw/Mn) are shown in Table 6.

Slurry Polymerization Activity

The slurry polymerization activity per gram of the solid catalyst component was calculated by dividing by the total mass of the propylene polymer and the solvent-soluble component by the mass of the solid catalyst component.

Polymerization Yield

The ratio of the mass of the solvent-soluble component to the total mass of the propylene polymer and the solvent-soluble component was taken as the polymerization yield.

Boiling Heptane Insoluble Content (HI)

5 g of the propylene polymer was placed in an extraction thimble. A boiling heptane soluble component was extracted using a high-temperature Soxhlet extractor, and the relative ratio (mass %) of the weight of the resulting residue to the weight of the propylene polymer was calculated, and taken as the boiling heptane insoluble content (HI).

TABLE 6

| | Slurry polymerization activity (g-pp/g-catalyst) | Polymerization yield (mass %) | HI (mass %) | MFR (g/10 min) | XS (mass %) | Mw/Mn |
|---|---|---|---|---|---|---|
| Example 20 | 19,700 | 98.8 | 98.2 | 16 | 1.5 | 4.4 |

INDUSTRIAL APPLICABILITY

It is possible to produce homopolypropylene having high activity and high stereoregularity, and a propylene-based random copolymer that includes a small amount of ethylene by utilizing the novel solid catalyst component for olefin polymerization according to the embodiments of the invention. When implementing multi-step continuous polymerization, a propylene-based block copolymer that exhibits high rigidity and high impact resistance can be produced in high yield by homopolymerizing propylene in the first step, and copolymerizing ethylene and propylene in the second step.

The invention claimed is:

1. A solid catalyst component, comprising magnesium, titanium, a halogen, a carbonate compound (A) represented by formula (1), and an ether compound (B) that comprises two or more ether groups, $$R^1-O-C(=O)-O-Z-O-R^2 \quad (1)$$

wherein $R^1$ and $R^2$ are each independently a hydrocarbon group or a substituted hydrocarbon group comprising 1 to 24 carbon atoms, or a heteroatom-containing group, and Z is a linking group that links two oxygen atoms through a carbon atom or a carbon chain, wherein the ether compound (B) is a compound represented by formula (3), $$R^7-O-CH_2CR^8R^9CH_2-O-R^{10} \quad (3)$$

wherein $R^8$ and $R^9$ are each independently a hydrogen atom, a halogen atom, an alkyl group comprising 1 to 12 carbon atoms, a vinyl group, an alkenyl group comprising 3 to 12 carbon atoms, a cycloalkyl group comprising 3 to 12 carbon atoms, a cycloalkenyl group comprising 3 to 12 carbon atoms, an aromatic hydrocarbon group comprising 6 to 12 carbon atoms, a halogen-substituted aromatic hydrocarbon group comprising 6 to 12 carbon atoms, a substituted aromatic hydrocarbon group comprising 7 to 12 carbon atoms, an alkylamino group comprising 1 to 12 carbon atoms, or a dialkylamino group comprising 2 to 12 carbon atoms, and $R^7$ and $R^{10}$ are each independently an alkyl group comprising 1 to 12 carbon atoms, a vinyl group, an alkenyl group comprising 3 to 12 carbon atoms, a cycloalkyl group comprising 3 to 6 carbon atoms, an aromatic hydrocarbon group comprising 6 to 12 carbon atoms, a halogen-substituted aromatic hydrocarbon group comprising 6 to 12 carbon atoms, or a substituted aromatic hydrocarbon group comprising 7 to 12 carbon atoms.

2. The solid catalyst component according to claim 1, wherein the hydrocarbon group or the substituted hydrocarbon group comprising 1 to 24 carbon atoms is a linear alkyl group, a branched alkyl group, a vinyl group, a linear alkenyl group, a branched alkenyl group, a linear halogen-substituted alkyl group, a branched halogen-substituted alkyl group, a linear halogen-substituted alkenyl group, a branched halogen-substituted alkenyl group, a cycloalkyl group, a cycloalkenyl group, a halogen-substituted cycloalkyl group, a halogen-substituted cycloalkenyl group, an aromatic hydrocarbon group, or a halogen-substituted aromatic hydrocarbon group.

3. The solid catalyst component according to claim wherein $R^1$ and $R^2$ are each independently the heteroatom-containing group, which is a nitrogen atom-containing hydrocarbon group terminated by a carbon atom, an oxygen atom-containing hydrocarbon group terminated by a carbon atom, a phosphorus-containing hydrocarbon group terminated by a carbon atom, or a silicon-containing hydrocarbon group terminated by a carbon atom.

4. The solid catalyst component according to claim 1, wherein Z is a group represented by formula (2), $$-CR^3R^4CR^5R^6- \quad (2)$$

wherein $R^3$ to $R^6$ are each independently a hydrogen atom, a halogen atom, an alkyl group comprising 1 to 12 carbon atoms, a vinyl group, an alkenyl group comprising 3 to 12 carbon atoms, a cycloalkyl group comprising 3 to 12 carbon atoms, a cycloalkenyl group comprising 3 to 12 carbon atoms, an aromatic hydrocarbon group comprising 6 to 12 carbon atoms, or a substituted aromatic hydrocarbon group comprising 7 to 12 carbon atoms, and optionally bond to each other to form a ring.

5. The solid catalyst component according to claim 1, wherein the ether compound (B) is 2-isopropyl-2-isopentyl-1,3-dimethoxympane, or 2-isopropyl-2-isobutyl-1,3-dimethoxypropane.

6. The solid catalyst component according to claim 1, comprising the ether compound (B) in an amount equal to or larger than 0.02 mmol/g-solid catalyst component.

7. The solid catalyst component according to claim 1, wherein a molar ratio of the carbonate compound (A) to the ether compound (B) is 2.5 or more.

8. A method for producing a solid catalyst component, the method comprising:

bringing a magnesium compound, a halogen-containing titanium compound, a carbonate compound (A) represented by formula (1), and an ether compound (B) that comprises two or more ether groups, into contact with each other, $$R^1-O-C(=O)-O-Z-O-R^2 \quad (1)$$

wherein $R^1$ and $R^2$ are each independently a hydrocarbon group or a substituted hydrocarbon group comprising 1 to 24 carbon atoms, or a heteroatom-containing group, and Z is a linking group that links two oxygen atoms through a carbon atom or a carbon carbon chain, wherein the ether compound (B) is a compound represented by formula (3), $$R^7-O-CH_2CR^8R^9CH_2-O-R^{10} \quad (3)$$

wherein $R^8$ and $R^9$ are each independently a hydrogen atom, a halogen atom, an alkyl group comprising 1 to 12 carbon atoms, a vinyl group, an alkenyl group comprising 3 to 12 carbon atoms, a cycloalkyl group comprising 3 to 12 carbon atoms, a cycloalkenyl group comprising 3 to 12 carbon atoms, an aromatic hydrocarbon group comprising 6 to 12 carbon atoms, a halogen-substituted aromatic hydrocarbon group comprising 6 to 12 carbon atoms, a substituted aromatic hydrocarbon group comprising 7 to 12 carbon atoms, an alkylamino group comprising 1 to 12 carbon atoms, or a dialkylamino group comprising 2 to 12 carbon atoms, and $R^7$ and $R^{10}$ are each independently an alkyl group comprising 1 to 12 carbon atoms, a vinyl group, an alkenyl group comprising 3 to 12 carbon atoms, a cycloalkyl group comprising 3 to 6 carbon atoms, an aromatic hydrocarbon group comprising 6 to 12 carbon atoms, a halogen-substituted aromatic hydrocarbon group comprising 6 to 12 carbon atoms, or a substituted aromatic hydrocarbon group comprising 7 to 12 carbon atoms.

9. An olefin polymerization catalyst, comprising
(I) the solid catalyst component according to claim 1, and
(II) an organoaluminum compound represented by formula (4), $$R^{11}_p AlQ_{3-p} \tag{4}$$

wherein each $R^{11}$ is independently an alkyl group comprising 1 to 6 carbon atoms, Q is a hydrogen atom or a halogen atom, and p is a real number that satisfies $0 < p \leq 3$.

10. The olefin polymerization catalyst according to claim 9, further comprising
(III) an external electron donor compound.

11. The olefin polymerization catalyst according to claim 10, wherein the external electron donor compound (III) is at least one organosilicon compound selected from the group consisting of an organosilicon compound represented by formula (5) and an organosilicon compound represented by formula (6), $$R^{12}_q Si(OR^{13})_{4-q} \tag{5}$$

wherein each $R^{12}$ is independently an alkyl group comprising 1 to 12 carbon atoms, a vinyl group, an allyl group, an aralkyl group, a cycloalkyl group comprising 3 to 12 carbon atoms, a phenyl group, an alkylamino group comprising 1 to 12 carbon atoms, or a dialkylamino group comprising 1 to 12 carbon atoms, q is an integer that satisfies $0 < q \leq 3$, and each $R^{13}$ is independently an alkyl group comprising 1 to 4 carbon atoms, a cycloalkyl group comprising 3 to 6 carbon atoms, a phenyl group, a vinyl group, an allyl group, or an aralkyl group, $$(R^{14}R^{15}N)_s SiR^{16}_{4-s} \tag{6}$$

wherein $R^{14}$ and $R^{15}$ are each independently a hydrogen atom, a linear alkyl group comprising 1 to 20 carbon atoms, a branched alkyl group comprising 3 to 20 carbon atoms, a vinyl group, an aralkyl group, an alkenyl group comprising 3 to 20 carbon atoms, a cycloalkyl group comprising 3 to 20 carbon atoms, a cycloalkenyl group comprising 3 to 20 carbon atoms, or an aryl group comprising 6 to 20 carbon atoms, and optionally bond to each other to form a ring, each $R^{16}$ is independently a linear alkyl group comprising 1 to 20 carbon atoms, a branched alkyl group comprising 3 to 20 carbon atoms, a vinyl group, an aralkyl group, an alkenyl group comprising 3 to 12 carbon atoms, a cycloalkyl group comprising 3 to 20 carbon atoms, or an aryl group comprising 6 to 20 carbon atoms, and s is an integer of from 1 to 3.

12. A method for producing an olefin polymer, the method comprising:
polymerizing an olefin in the presence of the olefin polymerization catalyst according to claim 9.

13. The method according to claim 12, comprising copolymerizing propylene and an α-olefin.

14. The method according to claim 13, comprising homopolymerizing propylene, or copolymerizing propylene and ethylene, and then copolymerizing the homopolymer and ethylene, the homopolymer and another α-olefin, the copolymer and ethylene or the copolymer and another α-olefin.

* * * * *